(12) United States Patent
Kim

(10) Patent No.: US 10,743,966 B2
(45) Date of Patent: Aug. 18, 2020

(54) IMPLANT UNIT

(71) Applicant: Kwang Seob Kim, Fullerton, CA (US)

(72) Inventor: Kwang Seob Kim, Fullerton, CA (US)

( * ) Notice: Subject to any disclaimer, the term of this patent is extended or adjusted under 35 U.S.C. 154(b) by 0 days.

(21) Appl. No.: 15/002,621

(22) Filed: Jan. 21, 2016

(65) Prior Publication Data

US 2016/0206407 A1 Jul. 21, 2016

(30) Foreign Application Priority Data

Jan. 21, 2015 (KR) .................. 10-2015-0010145
Jan. 21, 2015 (KR) .................. 10-2015-0010146
Jun. 8, 2015 (KR) .................. 10-2015-0080914

(51) Int. Cl.
*A61C 8/00* (2006.01)

(52) U.S. Cl.
CPC ........... *A61C 8/0037* (2013.01); *A61C 8/006* (2013.01); *A61C 8/0022* (2013.01); *A61C 8/0039* (2013.01); *A61C 8/0056* (2013.01); *A61C 8/0062* (2013.01)

(58) Field of Classification Search
CPC ............... A61C 8/0037; A61C 8/0045; A61C 8/006–0063; A61C 8/0068; A61C 8/0075–0078; A61C 8/0033; A61C 8/0059; A61C 8/0057; A61C 8/0086; A61C 8/0022; A61C 8/0039; A61C 8/0056; A61C 8/0078; A61C 8/0062; A61C 8/0018
USPC ........................................................ 433/221
See application file for complete search history.

(56) References Cited

U.S. PATENT DOCUMENTS

| | | | | |
|---|---|---|---|---|
| 3,726,011 A | * | 4/1973 | Savignano | A61C 8/0075 433/174 |
| 4,722,688 A | * | 2/1988 | Lonca | A61C 3/02 433/173 |
| 4,746,293 A | * | 5/1988 | Lundgren | A61C 8/005 433/169 |
| 4,756,689 A | * | 7/1988 | Lundgren | A61C 8/005 433/169 |
| 4,976,739 A | * | 12/1990 | Duthie, Jr. | A61C 8/0022 433/174 |
| 4,988,299 A | * | 1/1991 | Branemark | A61C 8/0022 433/174 |
| 5,106,300 A | * | 4/1992 | Voitik | A61C 8/0048 433/173 |
| 5,302,126 A | * | 4/1994 | Wimmer | A61C 8/0022 433/173 |
| 5,316,476 A | * | 5/1994 | Krauser | A61C 8/0018 433/173 |
| 5,344,318 A | * | 9/1994 | Wilson | A61C 8/0048 433/169 |

(Continued)

FOREIGN PATENT DOCUMENTS

EP 2803331 11/2014
KR 10-2006-0135786 12/2006
(Continued)

*Primary Examiner* — Sean M Michalski
*Assistant Examiner* — Shannel N Wright

(57) ABSTRACT

Provided is an implant unit, and more particularly, a dental implant unit. The implant unit includes a fixture assembled to an alveolar bone; and an abutment assembled to the upper portion of the fixture, wherein the fixture includes a space defined by a groove-like structure formed in depth direction from the lower portion of the fixture facing the alveolar bone.

7 Claims, 16 Drawing Sheets

(56) References Cited

U.S. PATENT DOCUMENTS

| | | | | |
|---|---|---|---|---|
| 5,433,606 A * | 7/1995 | Niznick | A61C 8/0018 | 433/173 |
| 5,449,291 A * | 9/1995 | Lueschen | A61C 8/005 | 433/172 |
| 5,527,183 A * | 6/1996 | O'Brien | A61C 8/0001 | 433/173 |
| 5,702,252 A * | 12/1997 | Rogers | A61C 8/005 | 433/173 |
| 5,816,812 A * | 10/1998 | Kownacki | A61C 8/0022 | 433/173 |
| 5,885,079 A * | 3/1999 | Niznick | A61C 8/0022 | 433/174 |
| 5,888,218 A * | 3/1999 | Folsom | A61C 8/0018 | 433/172 |
| 5,989,028 A * | 11/1999 | Niznick | A61C 8/0022 | 433/173 |
| 6,068,480 A * | 5/2000 | Misch | A61C 8/0001 | 433/173 |
| 6,155,829 A * | 12/2000 | Maino | A61C 8/005 | 433/173 |
| 6,174,167 B1 * | 1/2001 | Wohrle | A61C 8/0012 | 433/173 |
| 6,203,324 B1 * | 3/2001 | Wils | A61C 8/0022 | 433/173 |
| 6,402,515 B1 * | 6/2002 | Palti | A61C 8/0022 | 433/174 |
| 6,419,492 B1 * | 7/2002 | Schroering | A61C 8/0018 | 433/173 |
| 6,461,160 B1 * | 10/2002 | Sutter | A61C 8/0012 | 433/172 |
| 6,743,018 B1 * | 6/2004 | Morrow | A61C 8/005 | 411/55 |
| 7,097,453 B1 * | 8/2006 | Schroering, Jr. | A61C 8/0018 | 433/173 |
| 7,300,282 B2 * | 11/2007 | Sapian | A61C 8/0057 | 433/169 |
| 8,092,219 B2 * | 1/2012 | Neumeyer | A61C 8/0001 | 433/173 |
| 8,485,819 B2 * | 7/2013 | Callan | A61C 8/0048 | 433/173 |
| 9,333,054 B1 * | 5/2016 | Garfinkel | A61C 8/0009 | |
| 9,717,571 B2 * | 8/2017 | Goodman | A61C 8/0068 | |
| 2003/0118968 A1 * | 6/2003 | Massoud | A61C 8/0006 | 433/173 |
| 2007/0196786 A1 * | 8/2007 | Mundwiler | A61C 8/005 | 433/173 |
| 2011/0311947 A1 * | 12/2011 | Schoene | A61C 8/005 | 433/174 |
| 2012/0100503 A1 * | 4/2012 | Blackbeard | A61C 8/005 | 433/174 |
| 2014/0011160 A1 * | 1/2014 | Jorneus | A61C 8/0068 | 433/174 |
| 2014/0272791 A1 * | 9/2014 | Sanchez | A61C 8/0075 | 433/173 |
| 2016/0008105 A1 * | 1/2016 | Svoboda | A61C 8/0022 | 433/174 |
| 2017/0172714 A1 * | 6/2017 | Blaisdell | A61C 13/20 | |
| 2017/0224447 A1 * | 8/2017 | Richard | A61C 8/0063 | |

FOREIGN PATENT DOCUMENTS

| | | |
|---|---|---|
| KR | 10-2010-0118646 | 11/2010 |
| KR | 20-0456270 | 10/2011 |
| WO | WO 2013-186764 | 12/2013 |

* cited by examiner

IMPLANT UNIT

CROSS-REFERENCE TO RELATED APPLICATION

This application claims priority of Korean Patent Application No. 10-2015-0010145, filed on Jan. 21, 2015, priority of Korean Patent Application No. 10-2015-0010146, filed on Jan. 21, 2015, and priority of Korean Patent Application No. 10-2015-0080914, filed on Jun. 8, 2015, in the KIPO (Korean Intellectual Property Office), the disclosure of which is incorporated herein entirely by reference.

BACKGROUND OF THE INVENTION

Field of the Invention

Embodiments of the present disclosure relate to an implant unit, and more particularly, to a dental implant unit.

Description of the Related Art

An artificial tooth is an artificially fabricated tooth that is almost identical a natural tooth of a man in terms of the appearance and functions. The artificial tooth is used to replace a natural tooth when the natural tooth is damaged or missing based on various causes, such as a cavity.

In case of replacing a natural tooth with the artificial tooth based on symptoms and prognosis of odontopathies, there are three common approaches including a bridge, a denture, and an implant into an alveolar bone. In case of the bridge, it is necessary to drill healthy adjacent teeth. As a result, natural teeth are damaged. Furthermore, masticating force is weakened due to lack of a dental root, and lifespan thereof is only about ten years. In case of the denture, natural teeth are damaged and the alveolar bone is gradually absorbed. Furthermore, the denture may be detached from the mouth of a user or may irritate the mount of the user.

Meanwhile, an implant surgery for implanting an artificial tooth to the alveolar bone does not damage adjacent natural teeth and may be independently implanted as long as the alveolar bone maintains a suitable condition for the implant surgery. Furthermore, after the implant surgery, the appearance and functions of the artificial tooth are excellent and hardly distinguishable from natural teeth. Therefore, implant surgeries are being widely performed. Furthermore, an implant unit used for the implant surgeries may be permanently used with proper cares.

A conventional implant unit for implanting an artificial tooth to the alveolar bone generally includes a crown that functions as a tooth, a fixture functions as a dental root, and an abutment interconnecting the crown and the fixture. In case of the implant unit, when weights are continuously applied in the mouth as a user masticates the food, the alveolar bone may be damaged or the alveolar bone may be absorbed due to continuous stress concentration, thereby causing additional odontopathies or reducing lifespan of the implant unit. Furthermore, if the alveolar bone is already significantly absorbed, it is difficult or impossible to apply a conventional implant unit without performing an additional bone grafting surgery, e.g., a case where a distance to a paranasal sinus (maxillary sinus) at the maxillary molar is insufficient or a case where a distance to a nerve at the mandible molar is insufficient.

SUMMARY OF THE INVENTION

Embodiments of the present invention include an implant unit that is capable of preventing absorption of an alveolar bone for permanent use of the implant unit and prevention of additional odontopathies due to the implant unit, increasing success rate of a bone grafting surgery, and may be stably implanted without a limit of thickness of the alveolar bone. Furthermore, an assembly structure capable of dispersing stress between a fixture and an abutment may increase lifespan of an implant unit.

Embodiments of the present invention also include an implant unit that is capable of reducing and eliminating possible continuous stress to the implant unit for permanent use of the implant unit and prevention of additional odontopathies due to the implant unit and may be immediately implanted to a patient without an additional bone grafting surgery even if a relatively large portion of the alveolar bone of the patient is absorbed.

Embodiments of the present invention also include an implant unit that is capable of reducing and eliminating possible continuous stress to the implant unit in irregular directions for permanent use of the implant unit and prevention of additional odontopathies due to the implant unit.

According to an aspect of the present disclosure, there is provided an implant unit including a fixture assembled to an alveolar bone; and an abutment assembled to the upper portion of the fixture, wherein the fixture includes a space defined by a groove-like structure formed in the depth direction from the lower portion of the fixture facing the alveolar bone.

The fixture further may include a protruding column that protrudes from the bottom surface inside the groove-like structure toward the space. A screw thread may be formed on outer circumferential surface of the protruding column.

At least one or more slits that open side portions of the space may be formed at regions corresponding to the side portions of the space.

The abutment may include an assembly hole for connecting an upper portion and a lower portion of the abutment, and the fixture may include an assembly groove that is aligned to the assembly hole and forms a single groove portion together with the assembly hole when the abutment is assembled to the fixture. The implant unit may further include an assembling element to be assembled to the groove portion. The assembling element may include a body, which is formed to have a length identical to or smaller than that of the groove portion; and a head, which is connected to top of the body and is extended horizontally to have a width greater than that of the body to be accommodated on top of the abutment when the assembling element is assembled to the groove portion.

A ring-like trench that divides the upper portion of the fixture into an outer body and an inner body may be formed at the upper portion of the fixture in the depth direction. The inner body may have a polygonal cross-sectional shape, an elliptical cross-sectional shape, or an anti-slip bump for preventing the abutment from being relatively rotated and slipped. A stepped portion may be formed on the sidewall of the inner body, and a counter-step portion corresponding to the stepped portion may be formed on the sidewall of the lower portion of the abutment. A screw thread may be formed on inner circumferential surface of the fixture facing the space.

The fixture may include cut surfaces formed by cutting at least one side portion of outer circumferential surface of the fixture. The cut surfaces may include cut surfaces formed by removing two opposite side portions of the outer circumferential surface of the fixture that face each other.

According to another aspect of the present disclosure, there is provided an implant unit including a fixture assembled to an alveolar bone and a long hole formed in the fixture; and an abutment assembled to the long hole of the fixture, wherein a groove to be coupled to the abutment is formed on the inner surface of the fixture.

The implant unit may further include an assembling element that is rotation-assembled to interior of the abutment to fix the abutment to the fixture. The assembling element may be a shortened assembling element that is rotation-assembled to the interior of the abutment or an elongated assembling element that is rotation-assembled to the interior of the abutment and the interior of the fixture.

The long hole may include a bottom surface and a first coupling surface connected to top of the bottom surface, and the elongated assembling element may be rotation-assembled to the first coupling surface.

The long hole may include a first stepped surface that is extended horizontally outward from or is connected to top of first coupling surface. The long hole of the fixture may include a first extension surface that is connected to the first stepped surface and includes the groove formed therein, the abutment may include bumps formed on the lower portion of the abutment, and the bump of the abutment may be inserted to the groove of the fixture.

The first extension surface may include a first lower extension surface, the groove, and a first upper extension surface that are formed in a vertical direction upward, and the abutment may include a second extension surface connected to the upper of the bump. The long hole of the abutment may include a first assembling surface formed at the upper portion of the first extension surface, and the abutment may include a second assembling surface formed at the upper portion of the second extension surface.

The lower portion of the abutment may include a split rivet structure having a plurality of pieces apart from one another.

According to another aspect of the present disclosure, there is provided an implant unit including a fixture assembled to an alveolar bone and including bump formed along outer circumferential surface of the fixture; and an abutment assembled to top portion of the fixture.

The fixture may include a stress-reducing groove formed between the bump and the outer circumferential surface. The fixture may include a body that is implanted and assembled to the alveolar bone; and a settling portion that protrudes out of the upper portion of the alveolar bone and settling the abutment thereon, wherein the bump and the stress-reducing groove may be provided at top portion of the body.

The settling portion of the fixture and the abutment may be coupled to each other via at least one of a ring, a friction clip, and a bump pattern. The settling portion of the fixture may have at least one of a polygonal cross-sectional shape and an elliptical cross-sectional shape to prevent the abutment from being rotated and slipped.

The upper portion of the fixture may include an assembly groove formed in the depth direction, and the implant unit may further include an assembling element inserted to the assembly groove.

The upper portion of the settling portion may include a split rivet structure having a plurality of pieces apart from one another.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

It will be understood that when a layer is referred to as being "formed on," another layer, it can be directly formed on the other layer or intervening layers may be present therebetween. Likewise, when a material is referred to as being adjacent to another material, intervening materials may be present therebetween. In contrast, when a layer or material is referred to as being "directly" formed on, to another layer or material or as being "directly" adjacent to or contacting another layer or material, there are no intervening materials or layers therebetween.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1A:
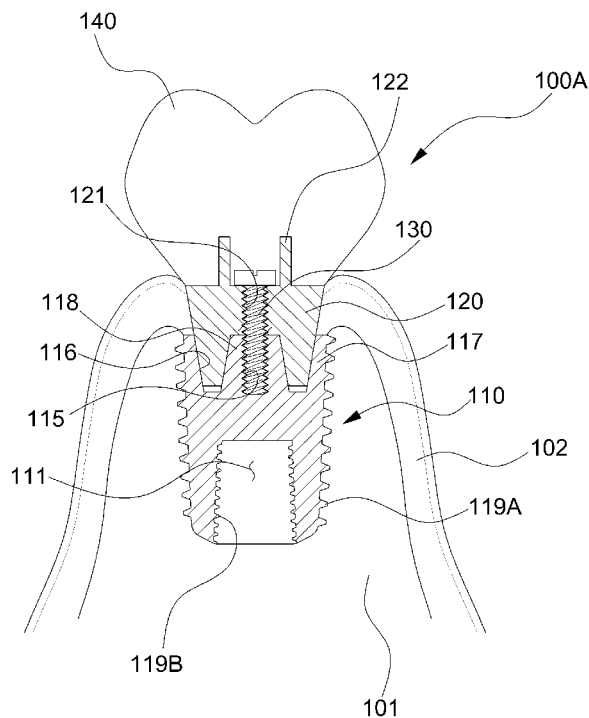
FIG. 1A is a sectional diagram showing an implant unit implanted to an alveolar bone according to an embodiment, and FIGS. 1B through 1E include sectional diagrams showing an implant unit before/after assembling elements are assembled and implant units according to types of assembling elements and plan views of upper portion of a fixture.

FIG. 1A is a sectional diagram showing an implant unit implanted to an alveolar bone according to an embodiment, and FIGS. 1B through 1E include sectional diagrams showing an implant unit before/after assembling elements are assembled and implant units according to types of assembling elements and plan views of the upper portion of a fixture.

Figure 1B:
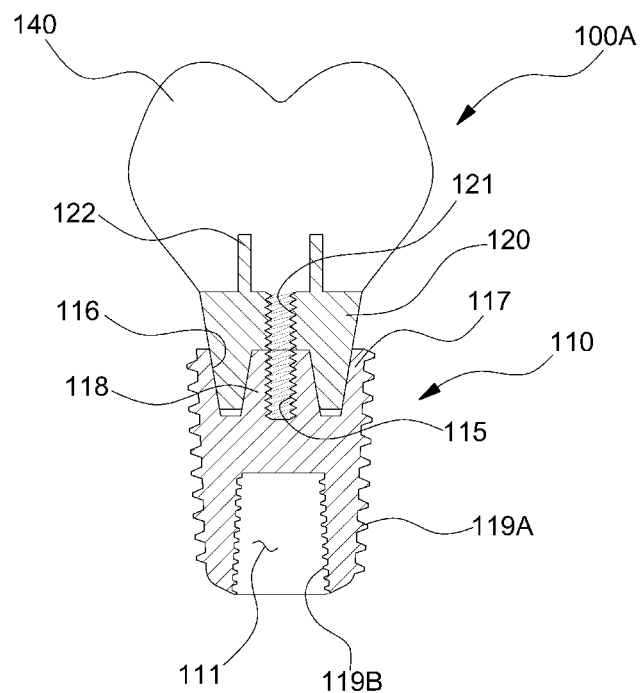

Referring to FIGS. 1A and 1B, an implant unit 100A according to an embodiment includes a fixture 110 assembled to an alveolar bone 101 and an abutment 120 assembled to the upper portion of the fixture 110. Here, the abutment 120 may be assembled to the fixture 110 via an assembling element 130. Furthermore, a crown 140 may be assembled onto the abutment 120. As shown in FIG. 1A, the fixture 110 is directly implanted to the alveolar bone 101 covered by a gum 102 and functions as a pillar. According to an embodiment of the present disclosure, the maximum diameter or width of the fixture 110 is within a range from 1 mm to 6 mm and may be within a range from 1 mm to 3 mm. The outer circumferential surface of the fixture 110 may be implanted to and integrated with the alveolar bone 101. Although the outer body of the fixture 110 shown in FIG. 1A has a tapered shape with a width decreasing downward (in FIG. 1A), it is merely an example, and the present disclosure is not limited thereto. For example, the fixture 110 may have a pillar-like shape having a constant width throughout in the length direction (the vertical direction in FIG. 1A) or may have a partially-tapered pillar-like shape. Furthermore, as shown in FIG. 1A, a thread, such as a screw thread 119A, may be formed on the outer circumferential surface of the fixture 110. In this case, the fixture 110 may be implanted and screw-fixed to the alveolar bone 101.

The fixture 110 may contain titanium, tungsten, aluminium, hafnium, niobium, tantalum, zirconium, platinum, or an alloy containing any one of the above-stated metals. However, the above-stated metals are merely examples, and the present disclosure is not limited thereto. Any of other non-corrosive metals with suitable strength and biocompatibility, ceramic artificial bone materials, or composite combinations thereof may be applied to the fixture 110.

According to some embodiments, the fixture 110 may include a calcium phosphate-based ceramic coating layer, such as apatite hydroxide ($Ca_{10}(PO_4)_6(OH)_2$, HA), having excellent bioactivity on the surface of the fixture 110 to improve adhesion by promoting reactivity against the alveolar bone 101. According to another embodiment, a metal ceramic, such as $TiO_2$, $Ta_2O_5$, $Nb_2O_5$, $ZrO_2$, $SiO_2$, $RuO_2$, $MoO_2$, $MoO_3$, $VO$, $VO_2$, $V_2O_3$, $V_2O_5$, $CrO_2$, or $CrO_3$, may be coated on the fixture 110. The above-stated metals are merely examples, and one of ordinary skill in the art will understand that an arbitrary material capable of promoting osseointegration may be used as the coating material.

The fixture 110 includes a space 111. The space 111 may be defined by a groove-like structure formed in the depth direction (the vertical direction in FIG. 1A) from the bottom portion of the fixture 110 facing the alveolar bone 101. If the fixture 110 is implanted to the alveolar bone 101, the space 111 may function as a nutrition supply channel between the gum 102 and the alveolar bone 101. If the space 111 is formed in the depth direction from the bottom portion of the fixture 110, additional nutrition may be smoothly supplied from the gum 102 to the alveolar bone 101, thereby stabilizing the alveolar bone 101. Therefore, the alveolar bone 101 may be prevented from being absorbed. Furthermore, if the fixture 110 includes the space 111, a space may be provided for bone cells to directly come out in case where bone transplant is necessary due to insufficient thickness of the alveolar bone 101, and thus success rate of the bone transplant may be increased. Furthermore, if the alveolar bone 101 is dissolved and a periodontal pocket is formed while the implant unit 100A is being used, the space 111 may prevent the periodontal pocket from being formed deep into the gum 102 and enable stable implant of the implant unit 100A having a relatively large diameter even if the thickness of the alveolar bone 101 for implanting the implant unit 100A is small.

According to an embodiment, the depth of the space 111 may be within a range from 5% to 80% of the overall length of the fixture 110 from the bottom end of the fixture 110. If the depth of the space 111 is smaller than 5% of the overall length of the fixture 110, sufficient space cannot be secured, and thus the space 111 cannot function as a channel as described above. On the contrary, if the depth of the space 111 exceeds 80% of the overall length of the fixture 110, it is difficult to obtain sufficient mechanical support.

According to an embodiment, a screw thread 119B may be formed on the inner circumferential surface of the fixture 110 facing the space 111. If the fixture 110 is implanted to the alveolar bone 101, the screw thread 119B strengthens assembly between the fixture 110 and the alveolar bone 101 together with the screw thread 119A formed on the outer circumferential surface of the fixture 110. As a result, structural stability of the fixture 110 may be secured, and thus lifespan of the implant unit 100A may be increased. However, it is merely an example. Since various assembling structures or assembling materials for strengthening assembly between the fixture 110 and the alveolar bone 101 other than the screw thread 119B may be formed on the inner circumferential surface of the fixture 110 facing the space 111, the present disclosure is not limited thereto.

According to an embodiment, the fixture 110 may include a trench 116 that divides the upper portion of the fixture 110 into an outer body 117 and an inner body 118. The trench 116 may be formed in the depth direction (the vertical direction in FIG. 1C) from the top of the fixture 110. Therefore, the trench 116 may be formed to have a ring-like shape surrounding the inner body 118 when viewed from above the fixture 110. The trench 116 provides a space for accommodating the lower portion of the abutment 120. In other words, when the abutment 120 is assembled to the fixture 110, the trench 116 formed at the upper portion of the fixture 110 functions as a groove and is male-female coupled with the lower portion of the abutment 120 having a bump corresponding to the groove. According to an embodiment, side surfaces of the trench 116 may include sloped surfaces. Therefore, the lower portion of the abutment 120 may include sloped surfaces corresponding thereto. If the trench 116 includes sloped side surfaces as described above, a contact area against the abutment 120 may increase and stress formed at the contact area between trench 116 and the abutment 120 may be dispersed. Therefore, fatigue may be reduced. As a result, lifespan of the implant unit 100A may be increased and the abutment 120 and the fixture 110 may be assembled to each other by being guided by the sloped side surfaces of the trench 116.

Figure 1C:
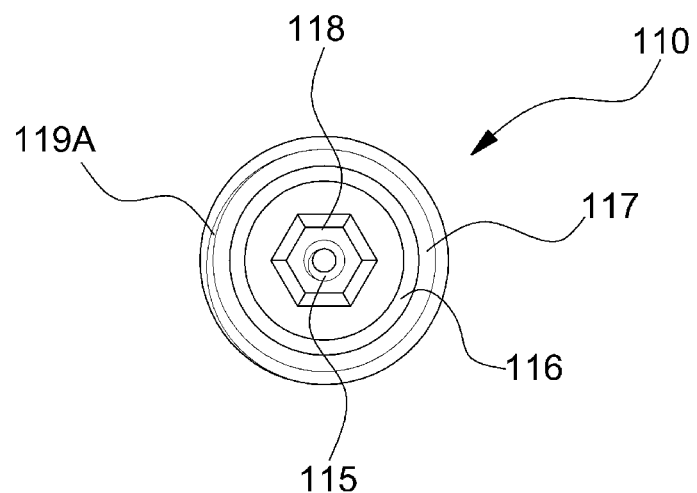

The inner body 118, which is separated from the outer body 117 by the trench 116, may be formed as a tapered pillar-like structure with the width decreasing upward. According to an embodiment, as shown in FIG. 1C, the upper portion of the inner body 118 may have a hexagonal cross-sectional shape to prevent rotation of the abutment 120. However, a structure for preventing rotation is not limited thereto, and the upper portion of the inner body 118 may have a rectangular, pentagonal, or elliptical cross-sectional shape. Furthermore, an anti-slip bump may be formed at the upper portion of the inner body 118. Therefore, when the fixture 110 and the abutment 120 are male-female coupled with each other, the structure of the upper portion structure of the fixture 110 as described above prevents the abutment 120 from being relatively rotated and slipped. Furthermore, the upper portion of the fixture 110 may include the inner body 118 only, where the outer body 117 may not exist.

Figure 1D:
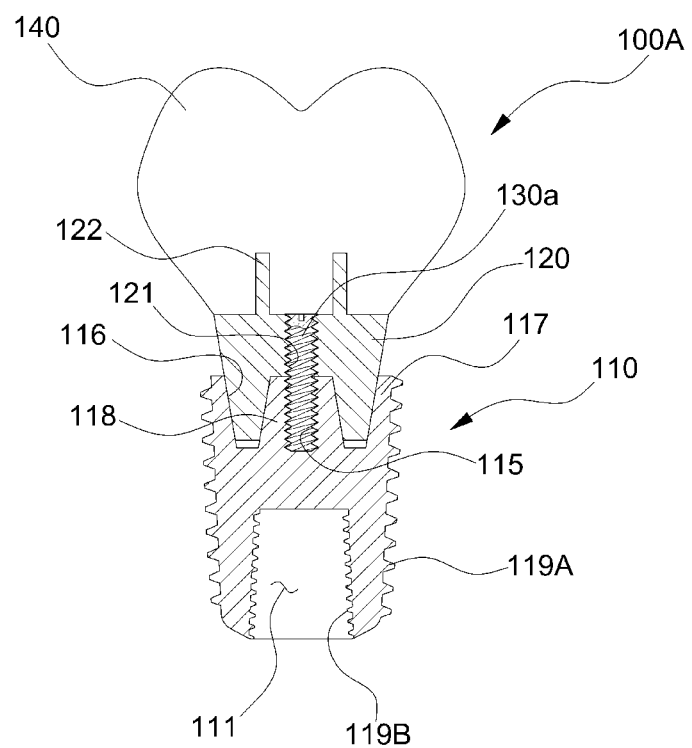
Figure 1E:
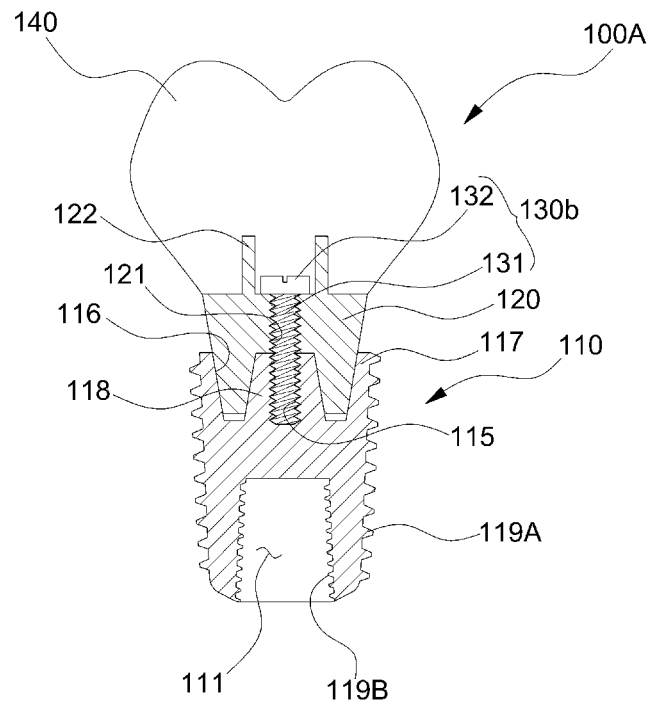

The fixture 110 may include an assembly groove 115, which, when the abutment 120 is assembled to the fixture 110, forms a single groove portion together with an assembly hole 121 formed at the abutment 120 by being aligned to the assembly hole 121. An assembling element 130a or 130b according to various embodiments as shown in FIGS. 1D and 1E are assembled to the groove portion, and thus the fixture 110 and the abutment 120 are firmly assembled to each other. FIG. 1D shows the assembling element 130a without a head, whereas FIG. 1E shows the assembling element 130b with a head. Detailed descriptions thereof will be given below.

Referring back to FIGS. 1A and 1B, the abutment 120 assembled to the upper portion of the fixture 110 functions as a supporting body for mounting an artificial tooth or the crown 140. The lower portion of the abutment 120 may include a bump structure to be male-female coupled to the upper portion of the fixture 110, that is, the outer body 117 and the inner body 118 separated from each other by the trench 116. In particular, as the side surfaces of the trench 116 are sloped, sidewalls of a bump of the lower portion of the abutment 120 that is accommodated and closely contacts the trench 116 may also be formed as sloped surfaces corresponding thereto. Furthermore, since the inner body 118 has a tapered hexagonal pillar-like structure with the width decreasing upward, sidewalls of a groove of the lower portion of the abutment 120 that closely contacts the inner body 118 may also have a structure corresponding thereto. Therefore, a contact area between the upper portion of the fixture 110 and the lower portion of the abutment 120 may increase and stress formed at the contact area therebetween may be dispersed. Therefore, fatigue may be reduced. Furthermore, the abutment 120 may be prevented from being relatively rotated and slipped, and thus a stable assembly structure may be formed.

The upper portion of the abutment 120 includes a coupling structure 122 that is formed to fix the crown 140 assembled thereto. The coupling structure 122 may be formed as a bump including one or two or more pillars, a hollow cylinder, or a cone protruding from the upper portion of the abutment 120. The coupling structure 122 increases a contact area against the crown 140 assembled to the abutment 120, thereby strengthening assembly between the abutment 120 and the crown 140.

The abutment 120 may be formed of any one selected from among titanium (Ti), a surgical stainless steel, gold (Au), a white ceramic zirconium (Zr), and equivalents thereof. However, materials constituting the abutment 120 are not limited thereto. For example, the abutment 120 may be fully or partially formed of a shape-memory alloy.

The abutment 120 includes the assembly hole 121 that connects the upper portion and the lower portion of the abutment 120. As described above, the assembly hole 121 is aligned to the assembly groove 115 formed at the fixture 110 and forms the groove portion. The assembling element 130a or 130b as shown in FIG. 1D or 1E is assembled to the groove, thereby assembling the fixture 110 to the abutment 120.

Referring to FIG. 1D, the implant unit 100A according to an embodiment may include the assembling element 130a that is assembled to the groove portion formed as the assembly hole 121 formed at the abutment 120 and the assembly groove 115 formed at the fixture 110 are aligned to each other. The assembling element 130a penetrates through the assembly hole 121 of the abutment 120 assembled to the upper portion of the fixture 110 and is inserted and fixed to the assembly groove 115 of the fixture 110. Therefore, the abutment 120 may be firmly coupled to the fixture 110. The length of the assembling element 130 may be identical to the length of the groove portion formed by the assembly hole 121 and the assembly groove 115. Furthermore, according to another embodiment, the length of the assembling element 130a may be smaller than that of the groove portion. Therefore, the top surface of the assembling element 130a and the top surface of the abutment 120 may be at a same height or the top surface of the assembling element 130a may be arranged lower than the top surface of the abutment 120. Accordingly, the assembling element 130a completely inserted to the groove portion allows subtle movement of the abutment 120, thereby dispersing stress transmitted from the abutment 120 to the fixture 110. For example, the assembling element 130a as described above is used, such that the implant unit 100A may function immediately after being implanted.

FIG. 1E exemplifies a case where the assembly hole 121 formed at the abutment 120 and the assembly groove 115 formed at the fixture 110 are assembled to each other via the other assembling element 130b. The assembling element 130b penetrates through the assembly hole 121 of the abutment 120 assembled to the upper portion of the fixture 110 and is inserted and fixed to the assembly groove 115 of the fixture 110. Therefore, the abutment 120 may be firmly coupled to the fixture 110.

The assembling element 130b may include a body 131 and a head 132. The length of the body 131 may be identical to or smaller than the length of the groove portion formed by the assembly hole 121 and the assembly groove 115. The head 132 is connected to the upper portion of the body 131 and is extended in horizontal directions (in FIG. 1E) to have a width greater than that of the body 131. Therefore, when the assembling element 130b is assembled to the groove portion, the body 131 is inserted to the groove portion, whereas the head 132 is accommodated on the upper portion of the abutment 120. Here, since the head 132 accommodated on the upper portion of the abutment 120 prevents the body 131 from being continuously inserted to the groove portion, if the body 131 is formed to have a length smaller than that of the groove portion, the bottom surface of the body 131 in the length direction (the vertical direction in FIG. 1E) is apart from the bottom surface of the groove portion. If the bottom surface of the body 131 is apart from the bottom surface of the groove portion as described above and a space is formed therebetween, vertical stress due to coupling of the assembling element 130b or repeated mastication of the food may be absorbed or dispersed. When the assembling element 130b is coupled, stress applied by the abutment 120 to the fixture 110 in the vertical direction may be strengthened by the head 132, and thus the assembling element 130b may provide firmer assembly between the fixture 110 and the abutment 120 as compared to the assembling element 130a without a head. Therefore, the assembling element 130b shown in FIG. 1E may be used when firmer assembly between the fixture 110 and the abutment 120 is demanded than an assembly provided by the assembling element 130a shown in FIG. 1D.

The assembling elements 130a and 130b of FIGS. 1D and 1E may be formed of a metal, such as a titanium (Ti) or a surgical stainless steel, or an alloy thereof for improving mechanical strength of the fixture 110, which may have insufficient mechanical strength.

According to the above-stated embodiment, if the implant unit 100A is implanted to the alveolar bone 101 via the space 111 formed from the lower portion of the fixture 110 facing the alveolar bone 101 in the depth direction, additional nutrition may be smoothly supplied from the gum 102 to the alveolar bone 101, thereby stabilizing the alveolar bone 101. Therefore, the alveolar bone 101 may be prevented from being absorbed. Furthermore, the space 111 provides a space for bone cells to directly come out in case where bone transplant is necessary due to insufficient thickness of the alveolar bone 101. In this case, success rate of the bone transplant may be increased. Furthermore, if the alveolar bone 101 is dissolved and a periodontal pocket is formed while the implant unit 100A is being used, the space 111 may prevent the periodontal pocket from being formed deep into the gum 102 and enable stable implant of the implant unit 100A having a relatively large diameter even if the thickness of the alveolar bone 101 for implanting the implant unit 100A is small. Furthermore, according to the above-stated embodiment, sufficient implant stability of the implant unit 100A may be secured by an assembly structure capable of dispersing stress between the fixture 110 and the abutment 120, thereby increasing lifespan of the implant unit 100A.

Figure 2:
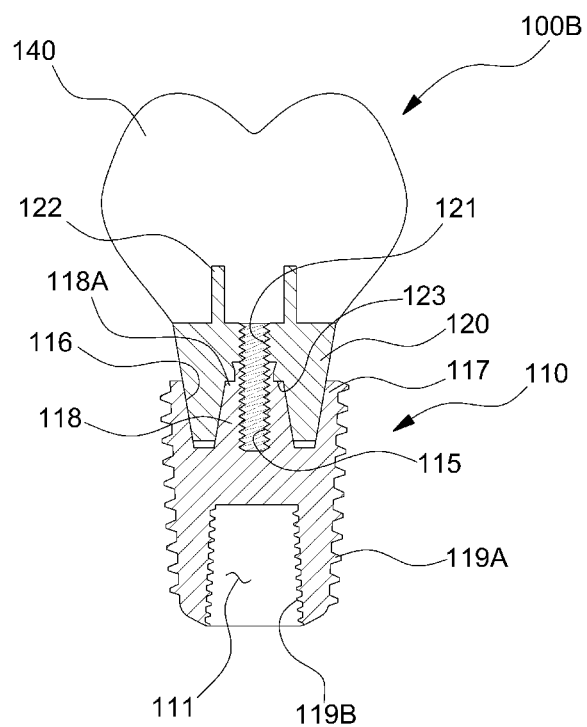
FIG. 2 is a sectional view of an implant unit according to another embodiment of the present disclosure.

FIG. 2 is a sectional view of an implant unit 100B according to another embodiment of the present disclosure. From among the components thereof, descriptions given above may be applied to components denoted by reference numerals same as those denoting the above-stated components unless being contradictory.

Referring to FIG. 2, the implant unit 100B according to another embodiment includes a fixture 110 assembled to an alveolar bone 101 and an abutment 120 assembled to the upper portion of the fixture 110. Here, the abutment 120 may be assembled to the fixture 110 via an assembling element 130a or 130b. Furthermore, a crown 140 may be assembled onto the abutment 120.

The fixture 110 includes a trench 116 that divides the upper portion of the fixture 110 into an outer body 117 and an inner body 118. Here, a stepped portion 118A may be formed on sidewalls of the inner body 118. The stepped portion 118A may function as a coupling element for inserting and fixing the abutment 120 to the fixture 110 without the element 130a or 130b as shown in FIG. 1D or FIG. 1E. In this case, the stepped portion 118A may have a suitable elastic structure to be temporarily deformed and recovered to allow assembly of the abutment 120 to the fixture 110.

The stepped portion 118A disperses vertical stress transmitted from the abutment 120 in horizontal directions. However, the shape of the stepped portion 118A is not limited to a shape extending in horizontal directions according to embodiments of the present disclosure. Since the sidewalls of the inner body 118 are sidewalls inside the trench 116 including the sloped sidewalls, the stepped portion 118A may have smaller inclined angles compared to that of the sidewalls of the inner body 118 to form a stepped portion. As a component corresponding to the stepped portion 118A, a counter-step portion 123 may be provided at the lower portion of the abutment 120.

The implant unit 100B includes the stepped portion 118A formed at the fixture 110 and the counter-step portion 123 formed at the abutment 120. Therefore, vertical stress transmitted from the abutment 120 to the fixture 110 may be dispersed in horizontal directions, thereby improving stability and lifespan of the implant unit 100B implanted to the alveolar bone 101.

Figure 3A:
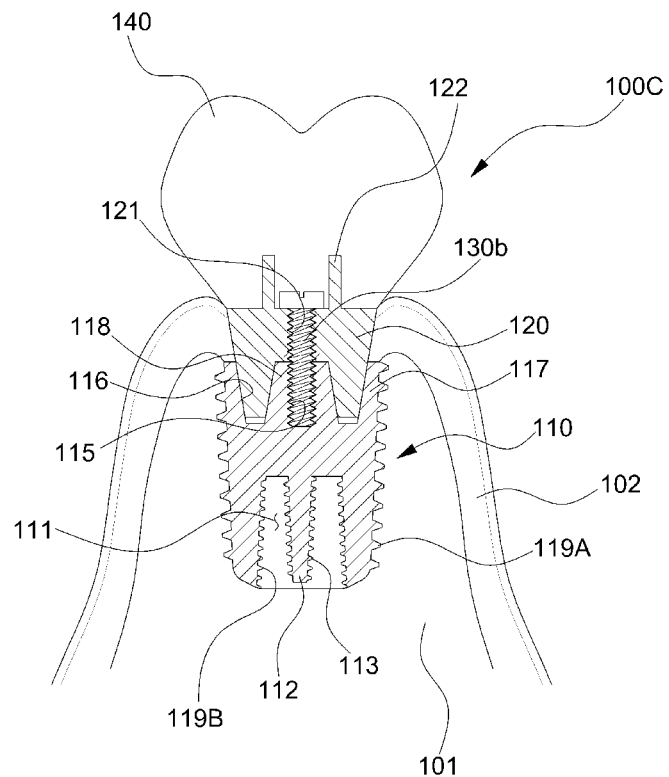
FIGS. 3A through 3C are a perspective view and sectional views of an implant unit according to another embodiment.
Figure 3B:
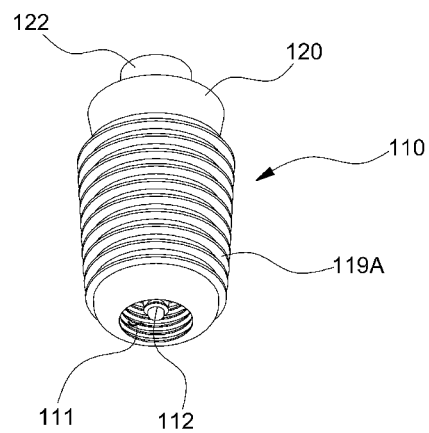
Figure 3C:
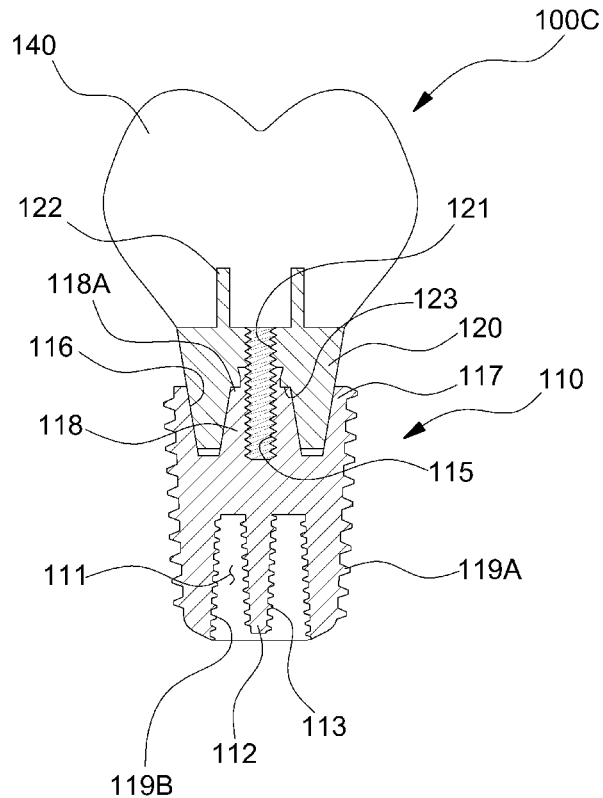

FIG. 3A is a sectional diagram showing an implant unit 100C implanted to an alveolar bone 101 according to another embodiment, and FIGS. 3B and 3C are a perspective view and a sectional view of the implant unit 100C. From among the components thereof, descriptions given above may be applied to components denoted by reference numerals same as those denoting the above-stated components unless being contradictory.

Referring to FIGS. 3A through 3C, the implant unit 100C according to another embodiment includes a fixture 110 assembled to the alveolar bone 101 and an abutment 120 assembled to the upper portion of the fixture 110. Here, the abutment 120 may be assembled to the fixture 110 via an assembling element 130b. Furthermore, a crown 140 may be assembled onto the abutment 120.

The fixture 110 includes a space 111 that is defined by a groove-like structure formed in the depth direction from the lower portion of the fixture 110 facing the alveolar bone 101. Furthermore, the fixture 110 may further include a protruding column 112 that protrudes from the bottom surface inside the groove-like structure toward the space 111. As shown in FIGS. 3A through 3C, the protruding column 112 may have a protruding length smaller than or identical to the depth of the space 111. According to another embodiment, the protruding column 112 may protrude out of the bottom portion of the fixture 110.

According to an embodiment, a screw thread 113 may be formed on the outer circumferential surface of the protruding column 112. Therefore, if the fixture 110 is implanted to the alveolar bone 101, the protruding column 112 strengthens assembly between the fixture 110 and the alveolar bone 101 together with a screw thread 119A formed on the outer circumferential surface of the fixture 110 and a screw thread 119B formed on the inner circumferential surface of the fixture 110 facing the space 111. As a result, structural stability of the fixture 110 may be secured, and thus lifespan of the implant unit 100C may be increased. If the protruding column 112 protrudes out of the bottom portion of the fixture 110, assembly between the fixture 110 and the alveolar bone 101 may be further strengthened as compared to the case in which the length of the protruding column 112 is smaller than or identical to the depth of the space 111.

The outer body of the protruding column 112 may have a tapered shape with a width decreasing downward (in FIGS. 3A through 3C). However, it is merely an example, and the present disclosure is not limited thereto. For example, the protruding column 112 may have a pillar-like shape having a constant width throughout in the lengthwise direction (the vertical direction in FIGS. 3A through 3C) or may have a partially-tapered pillar-like shape. According to the present embodiment, if the fixture 110 is implanted to the alveolar bone 101, assembly of the fixture 110 to the alveolar bone 101 may be further strengthened.

Figure 4A:
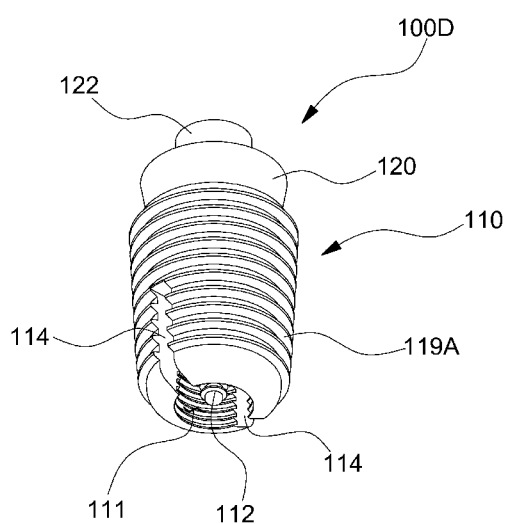
FIGS. 4A and 4B are a perspective view and a plan view of an implant unit according to another embodiment.
Figure 4B:
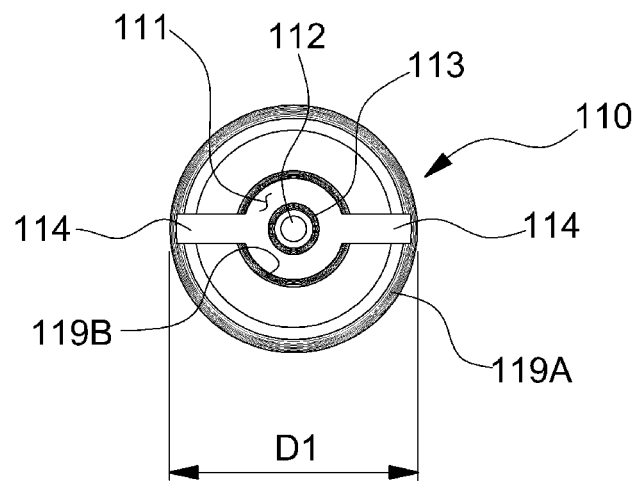
Figure 4C:
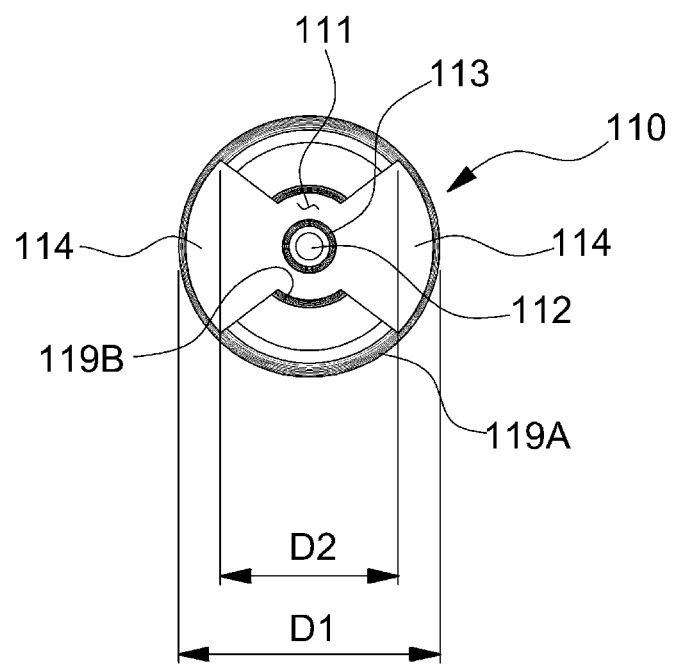
FIG. 4C is a plan view of the implant unit including an extended slit according to another embodiment.
Figure 4D:
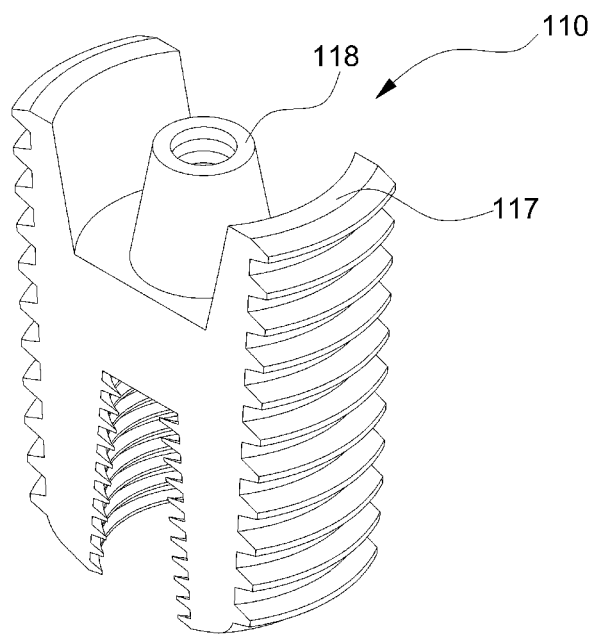
FIG. 4D is a perspective diagram showing a fixture constituting an implant unit according to another embodiment, in which two opposite side portions of outer circumference surfaces of the fixture are removed.
Figure 4E:
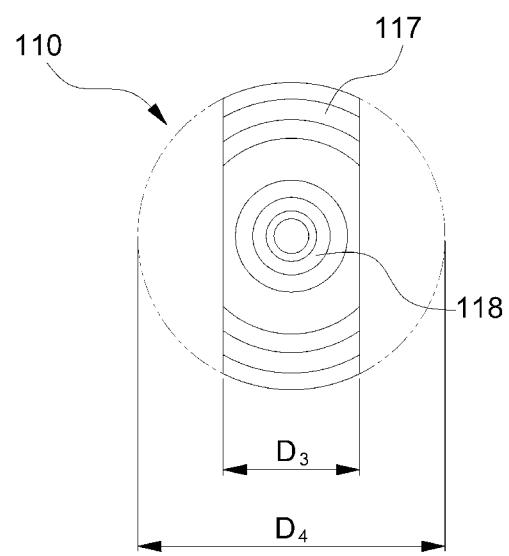
FIG. 4E is a plan view of the fixture of FIG. 4D, viewed from above.

FIG. 4A is a sectional view of an implant unit 100D according to another embodiment. FIG. 4B is a plan view of the implant unit 100D of FIG. 4A, viewed from below. FIG. 4C is a plan view of the implant unit 100D including an extended slit 114, viewed from below. FIG. 4D is a perspective diagram showing a fixture constituting an implant unit according to another embodiment, in which two opposite side portions of the outer circumference surfaces of the fixture are removed, and FIG. 4E is a plan view of the fixture of FIG. 4D, viewed from above. From among the components thereof, descriptions given above may be applied to components denoted by reference numerals same as those denoting the above-stated components unless being contradictory.

Referring to FIGS. 4A and 4B, the implant unit 100D according to another embodiment includes a fixture 110 assembled to an alveolar bone 101 and an abutment 120 assembled to the upper portion of the fixture 110. Here, the abutment 120 may be assembled to the fixture 110 via an assembling element 130a or 130b. Furthermore, a crown 140 may be assembled onto the abutment 120.

The fixture 110 includes a space 111 that is defined by a groove-like structure formed in the depth direction from the lower portion of the fixture 110 facing the alveolar bone 101. Furthermore, the fixture 110 may further include a protruding column 112 that protrudes from the bottom surface inside the groove-like structure toward the space 111, where a screw thread 113 is formed on the outer circumferential surface of the protruding column 112.

The fixture 110 may include a pair of slits 114 that are symmetrically formed at regions corresponding to side portions of the space 111. The pair of slits 114 may be formed along the outer circumferential surface of the fixture 110, thereby opening side portions of the space 111. The slits 114 connects to the space 111 with the side surfaces of the alveolar bone 101 contacting the outer circumferential surface of the fixture 110. In other words, according to an embodiment, when the pair of slits 114 are formed along the outer circumferential surface of the fixture 110, nutrition supply channels between the gum 102 and the alveolar bone 101 increase or are diverted. Therefore, additional nutrition may be smoothly supplied from the gum 102 to the alveolar bone 101, thereby properly stabilizing the alveolar bone 101. Therefore, the alveolar bone 101 may be prevented from being absorbed. Furthermore, if the pair of slits 114 connecting the alveolar bone 101 to the space 111 are formed on the outer circumferential surface of the fixture 110, more space may be provided for bone cells to directly come out in case where bone transplant is necessary due to insufficient thickness of the alveolar bone 101, and thus success rate of the bone transplant may be significantly increased. Furthermore, if the alveolar bone 101 is dissolved and a periodontal pocket is formed while the implant unit 100D is being used, the space 111 and the pair of slits 114 may prevent the periodontal pocket from being formed deep into the gum 102 and enable stable implant of the implant unit 100D having a relatively large diameter even if the thickness of the alveolar bone 101 for implanting the implant unit 100D is small.

Referring to FIG. 4C, the implant unit 100D according to another embodiment may include a slit 114 having an extended width (vertical length of the slit 114 in FIG. 4C) greater than that of the slits 114 of FIGS. 4A and 4B. For example, FIGS. 4A and 4B show cases where a length of one of arcs of the outer circumferential surface of the fixture 110 separated by the slit 114 is ⅖, 3/7, or ⅜ of the circumference of the circle corresponding to the outer circumferential surface of the fixture 110. Therefore, in the cases shown in FIGS. 4A and 4B, the implant unit 100D may be implanted to the alveolar bone 101 of which the thickness is at least D1.

FIG. 4C shows a case where a length of one of arcs of the outer circumferential surface of the fixture 110 is ¼ of the circumference of the circle corresponding to the outer circumferential surface of the fixture 110. Therefore, in the case shown in FIG. 4C, the implant unit 100D may be implanted to the alveolar bone 101 with a thickness smaller than D1, that is, the alveolar bone 101 with a thickness D2. In other words, if the width of the slit 114 is extended as shown in FIG. 4C, that is, if the length of an arc of the outer circumferential surface of the fixture 110 becomes shorter than those shown in FIGS. 4A and 4B, the implant unit 100D with sufficient supporting power may be stably implanted to the alveolar bone 101 without a bone grafting.

Referring to FIGS. 4D and 4E, the fixture 110 has cross-sections with two opposite side portions of outer circumferential surfaces removed. In other words, when viewed from above, the fixture 110 shown in FIGS. 4D and 4E does not have a circular cross-sectional shape, but an elliptical cross-sectional shape due to the removed side portions. Here, the two opposite side portions of the fixture 110 may be removed within a range to withstand rotation load and to prevent the alveolar bone 101 and the fixture 110 from being damaged while the fixture 110 is being implanted to the alveolar bone 101. Furthermore, although FIGS. 4D and 4E show two cut surfaces formed by cutting the two opposite side portions of the outer circumferential surface of the fixture 110, the fixture 110 may include cut surface formed by cutting at least one of side portions of the outer circumferential surface of the fixture 110.

The inner body 118 apart or separated from the outer body 117 by the trench 116 may be a tapered pillar-like structure with the width decreasing upward. The upper portion of the inner body 118 may have a circular cross-sectional shape as shown in FIG. 4D. However, to prevent the abutment 120 from being rotated, the upper portion of the inner body 118 may have a rectangular cross-sectional shape, a pentagonal cross-sectional shape, a hexagonal cross-sectional shape, or an elliptical cross-sectional shape. However, the cross-sectional shapes of the upper portion of the inner body 118 for preventing rotation of the abutment 120 are not limited thereto.

In FIGS. 4D and 4E, the thickness of the elliptical fixture 110 implanted to the alveolar bone 101 corresponds to D3, which may be smaller than thickness of a circular fixture, that is, a diameter D4. Therefore, the elliptical fixture 110 may be implanted to the alveolar bone 101 having a thickness smaller than the thickness D4 of a circular fixture. In other words, since the cross-sectional shape of the fixture 110 is elliptical, the implant unit 100D with sufficient supporting power may be stably implanted to the alveolar bone 101 without a bone grafting surgery even if the thickness of the alveolar bone 101 is relatively small.

Figure 5A:
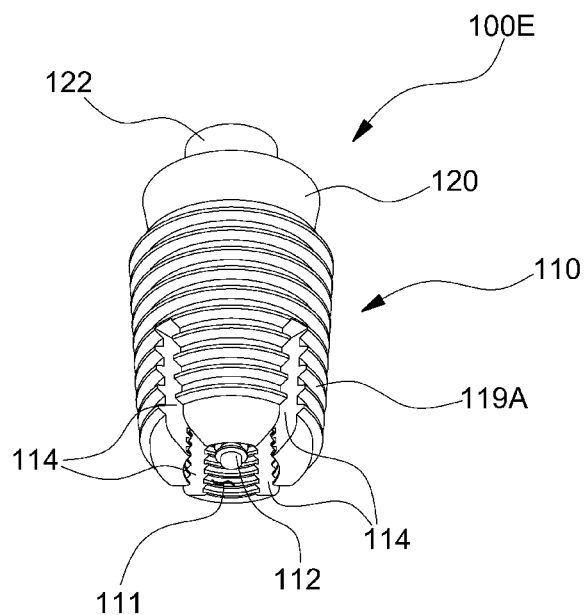
FIGS. 5A and 5B are a perspective view and a plan view of an implant unit according to another embodiment.

FIG. 5A is a sectional view of an implant unit 100E according to another embodiment, and FIG. 2B is a plan view of the implant unit 100E of FIG. 5A, viewed from below. From among the components thereof, descriptions given above may be applied to components denoted by reference numerals same as those denoting the above-stated components unless being contradictory.

Figure 5B:
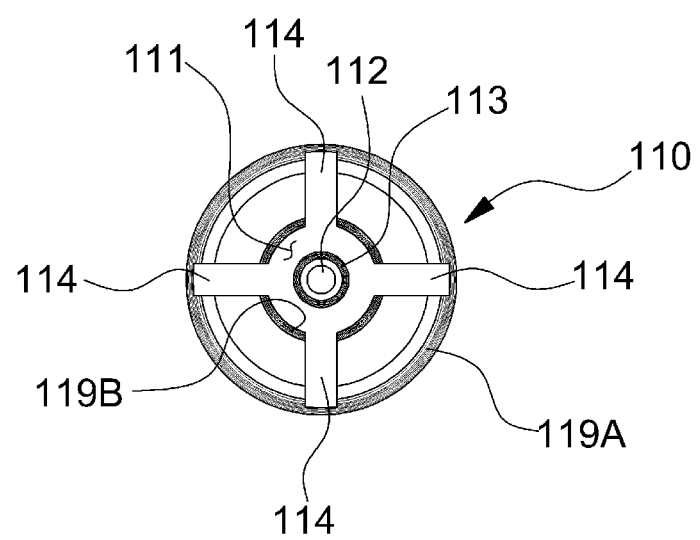

Referring to FIGS. 5A and 5B, the implant unit 100E according to another embodiment includes a fixture 110 assembled to an alveolar bone 101 and an abutment 120 assembled to the upper portion of the fixture 110. Here, the abutment 120 may be assembled to the fixture 110 via an assembling element 130a or 130b. Furthermore, a crown 140 may be assembled onto the abutment 120.

The fixture 110 includes a space 111 that is defined by a groove-like structure formed in the depth direction from the lower portion of the fixture 110 facing the alveolar bone 101. Furthermore, the fixture 110 may further include a protruding column 112 that protrudes from the bottom surface inside the groove-like structure toward the space 111, where a screw thread 113 is formed on the outer circumferential surface of the protruding column 112.

The fixture 110 may include four slits 114 that are symmetrically formed at regions corresponding to side portions of the space 111. The four slits 114 may be formed along the outer circumferential surface of the fixture 110 to open side portions of the space 111. The slits 114 connect the space 111 with the side surfaces of the alveolar bone 101 contacting the outer circumferential surface of the fixture 110.

Only one slit 114 may be formed at a region of the fixture 110 corresponding to side portions of the space 111. However, if the only one slit 114 is formed, stress may not be uniformly applied to the fixture 110, and thus the structural stability of the fixture 110 may be deteriorated. Therefore, a plurality of slits 114, that is, two or more slits 114 may be formed. Here, if the number of the plurality of slits 114 is an odd number, the plurality of slits 114 may not be formed symmetrically, and thus the structural stability of the fixture 110 may be deteriorated. Therefore, the number of the plurality of slits 114 may be an even number to form a symmetrical structure.

Figure 6:
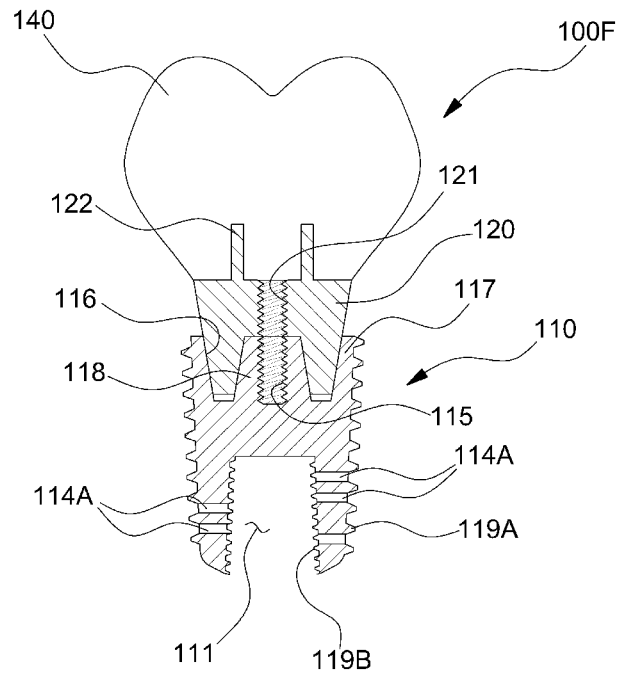
FIG. 6 is a sectional view of an implant unit according to another embodiment of the present disclosure.

FIG. 6 is a sectional view of an implant unit 100F according to another embodiment. From among the components thereof, descriptions given above may be applied to components denoted by reference numerals same as those denoting the above-stated components unless being contradictory.

Referring to FIG. 6, the implant unit 100F according to another embodiment includes a fixture 110 assembled to an alveolar bone 101 and an abutment 120 assembled to the upper portion of the fixture 110. Here, the abutment 120 may be assembled to the fixture 110 via an assembling element 130a or 130b. Furthermore, a crown 140 may be assembled onto the abutment 120.

The implant unit 100F may include at least one communication hole 114A that is formed at a region of the fixture 110 corresponding to side portions of the space 111 to open the side portions of the space 111. The communication hole 114A functions as a channel or a path that connects a portion of the alveolar bone 101 partially filling the space 111 and a portion of the alveolar bone 101 located on the outer circumferential surface of the fixture 110 to each other, thereby improving stability of the implanted implant unit 100F and enabling smooth supply of nutrition between portions of the alveolar bone 101 arranged inside and outside the fixture 110. For smooth nutrition supply, a plurality of communication holes 114A may be formed, where the plurality of communication holes 114A may be formed close to one another to form a mesh-like structure, for example. Here, the plurality of communication holes 114A may have combinations of various cross-sectional shapes including circular cross-sectional shapes, elliptical cross-sectional shapes, and polygonal cross-sectional shapes and sizes.

Figure 7:
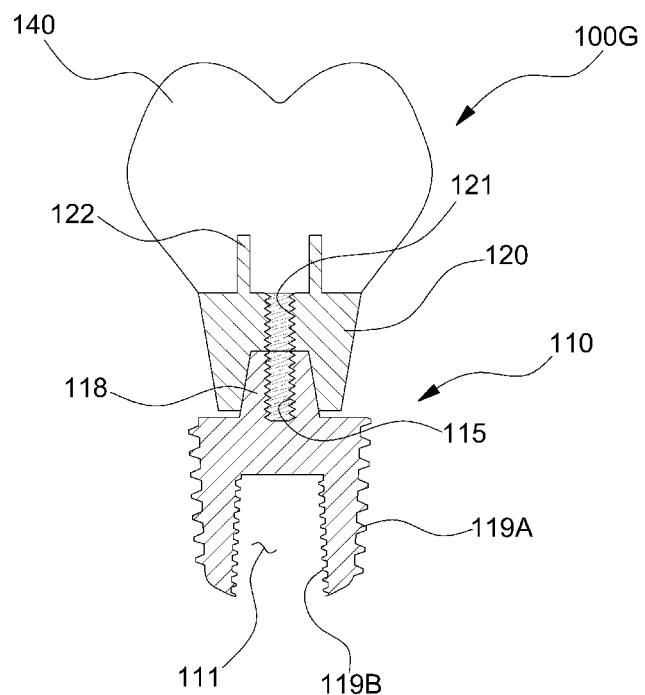
FIG. 7 is a sectional view of an implant unit according to another embodiment of the present disclosure.

FIG. 7 is a sectional view of an implant unit 100G according to another embodiment. From among the components thereof, descriptions given above may be applied to components denoted by reference numerals same as those denoting the above-stated components unless being contradictory.

Referring to FIG. 7, the implant unit 100G according to another embodiment includes a fixture 110 assembled to an alveolar bone 101 and an abutment 120 assembled to the upper portion of the fixture 110. Here, the abutment 120 may be assembled to the fixture 110 via an assembling element 130a or 130b. Furthermore, a crown 140 may be assembled onto the abutment 120.

The implant unit 100G according to the present embodiment has a structure from which an outer body 117 of the fixture 110 is omitted. If the outer body 117 is omitted at the fixture 110, the volume or the width of the fixture 110 is reduced in correspondence to the omitted outer body 117, and thus the implant unit 100G with sufficient supporting power may be implanted to the alveolar bone 101 with an insufficient thickness without a bone grafting. Here, if the outer body 117 of the fixture 110 is omitted and, as shown in FIG. 4C, a length of each of a first arc and a second arc of the outer circumferential surface of the fixture 110 facing each other is ¼ of the circumference of the circle corresponding to the outer circumferential surface of the fixture 110, the implant unit 100G may be implanted to the alveolar bone 101 with a significantly insufficient thickness.

Figure 8A:
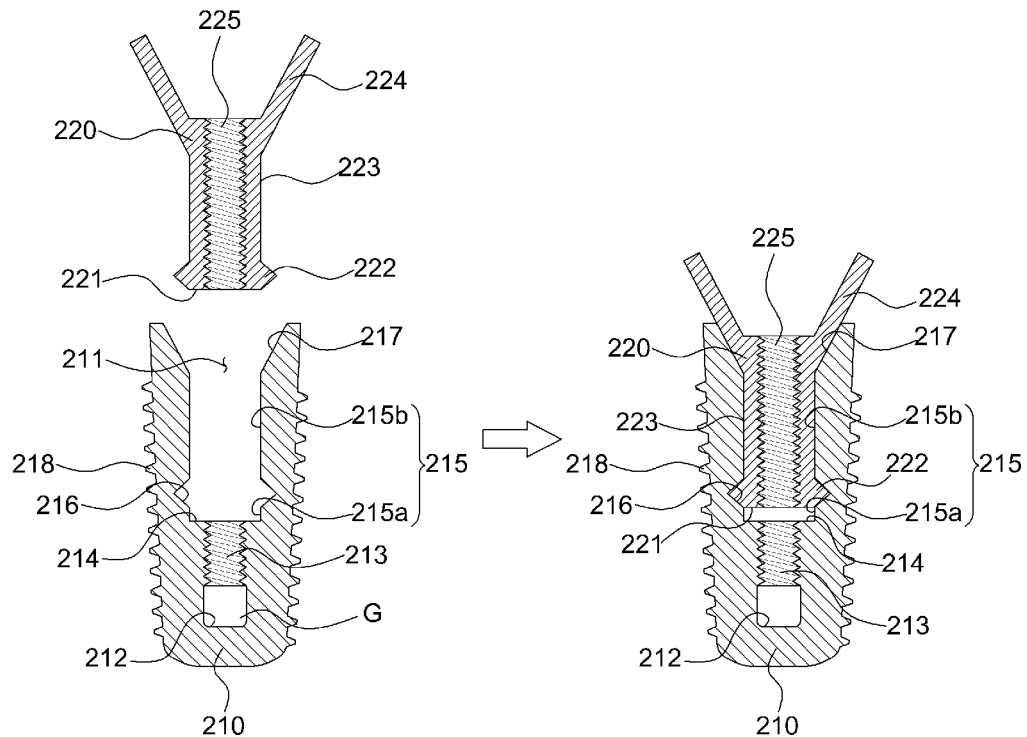
FIG. 8A is a sectional view of an implant unit according to another embodiment of the present disclosure.
Figure 8B:
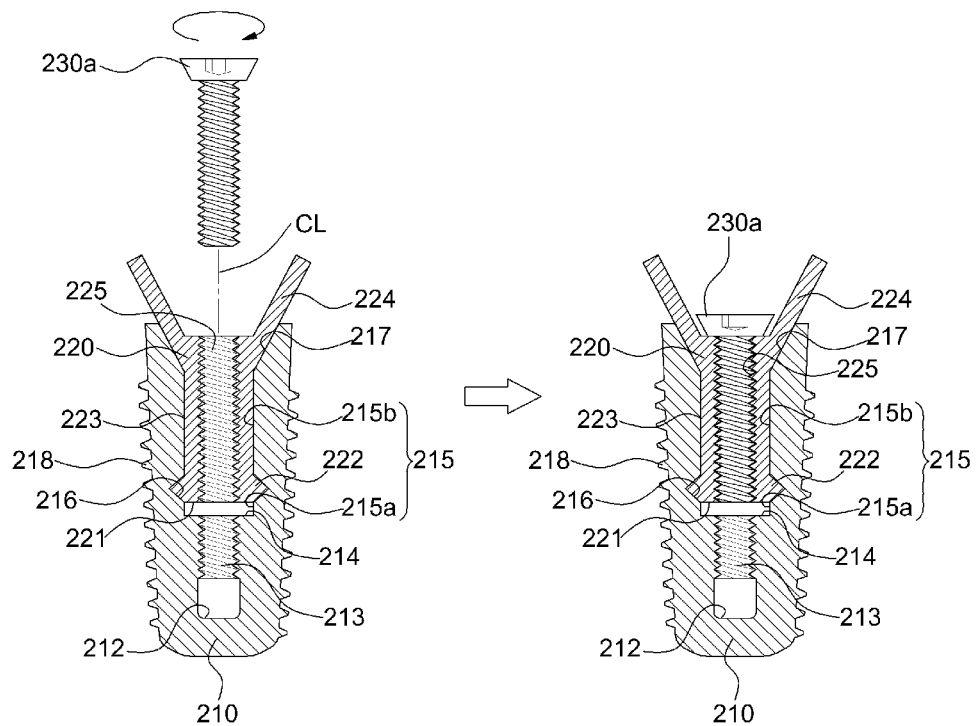
FIGS. 8B and 8C are sectional views of an implant unit to which assembling elements are assembled.
Figure 8C:
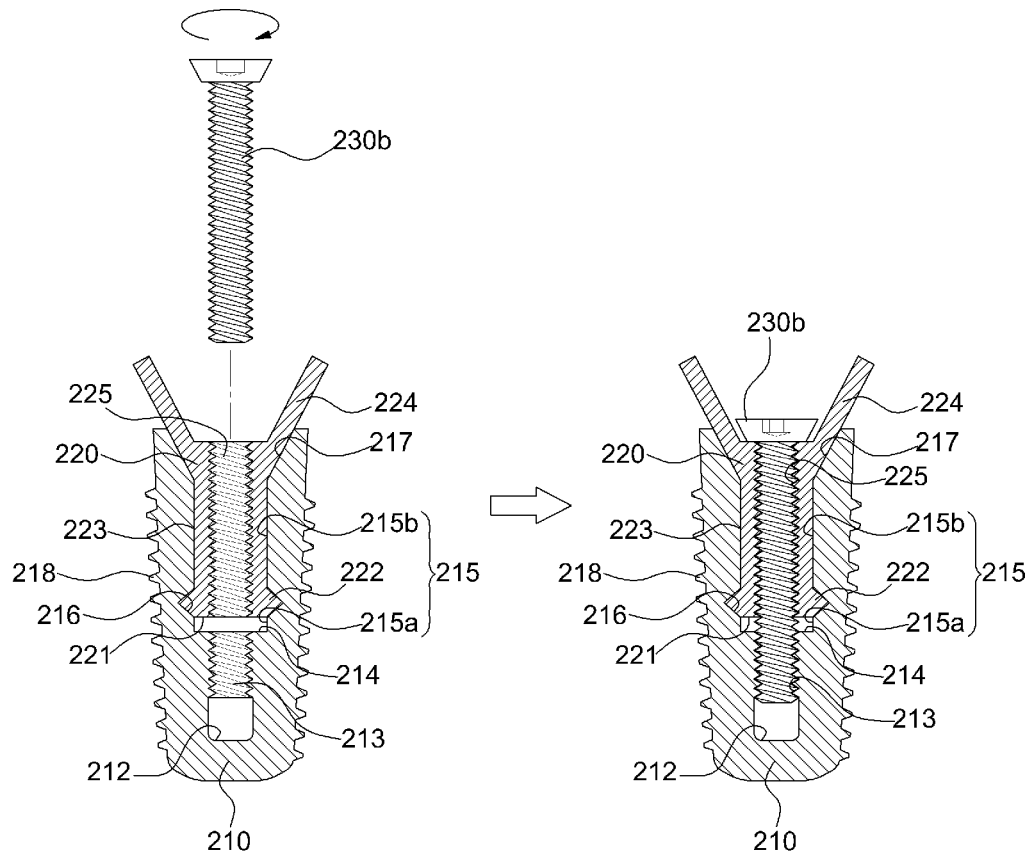
Figure 8D:
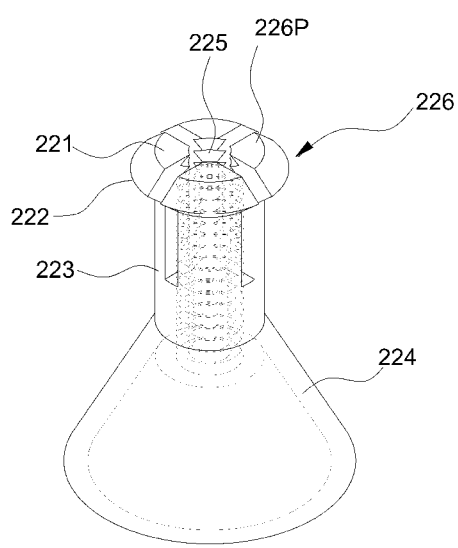
FIG. 8D is a perspective view of a bottom surface of an abutment.

FIG. 8A is a sectional view of an implant unit 200 according to another embodiment, FIGS. 8B and 8C are sectional views of the implant unit 200 having assembled there to assembling element 230a and 230b are assembled to, and FIG. 8D is a perspective view of a bottom surface 221 of an abutment 220.

Referring to FIG. 8A, the implant unit 200 includes a fixture 210, which is assembled to an alveolar bone 202 and includes a long hole 211 formed in the fixture 210, and an abutment 220, which is at least partially inserted and fixed to the long hole 211 of the fixture 210. A groove 216 for coupling the abutment 220 to the fixture 210 may be formed on the inner surface of the fixture 210.

The fixture 210 is directly implanted to the alveolar bone (jaw bone) formed below the gum and functions as a pillar. To this end, a plurality of screw threads or an irregular pattern may be formed on the outer surface of the fixture 210 to be assembled to the alveolar bone. FIG. 4 exemplifies screw threads. The fixture 210 may contain titanium (Ti), tungsten (W), aluminium (Al), hafnium (Hf), niobium (Nb), tantalum (Ta), zirconium (Zr), platinum (Pt), or an alloy of any one of the metals. However, the above-stated metals are merely examples, and the present disclosure is not limited thereto. Any of other non-corrosive metals with suitable strength and biocompatibility, ceramic artificial bone materials, or composite combinations thereof may be applied to the fixture 210.

The fixture 210 may include a calcium phosphate-based ceramic coating layer, such as apatite hydroxide ($Ca_{10}(PO_4)_6(OH)_2$, HA), having excellent bioactivity on the surface of the fixture 210 to improve adhesion by promoting reactivity against the alveolar bone 101. According to another embodiment, a metal ceramic, such as $TiO_2$, $Ta_2O_5$, $Nb_2O_5$, $ZrO_2$, $SiO_2$, $RuO_2$, $MoO_2$, $MoO_3$, VO, $VO_2$, $V_2O_3$, $V_2O_5$, $CrO_2$, or $CrO_3$, may be coated on the fixture 210. The above-stated metals are merely examples, and one of ordinary skill in the art will understand that an arbitrary material capable of promoting osseointegration may be used as the coating material.

According to some embodiments, the fixture 210 includes a long hole 211 that is formed downward from the center of the top surface of the fixture 210 to a certain depth. The long hole 211 may include a bottom surface 212, a first coupling surface 213 that extends upward from or connected to the bottom surface 212, a first stepped surface 214 (or a first horizontal surface) that is extended horizontally outward from or is connected to the first coupling surface 213, a first extension surface 215 that is extended upward from or connected to the first stepped surface 214, and a first assembling surface 217 that is extended upward from or connected to the first extension surface 215. The first extension surface 215 may be a vertical surface, a tapered surface, a curved surface, or a combination thereof. The first assembling surface 217 may be a tilted surface.

According to some embodiments, the abutment 220 may include a bottom surface 221, which is a flat surface, a bump 222 that is extended upward from or connected to the bottom surface 221, a second extension surface 223 that is extended upward from or connected to the bump 222, and a second assembling surface 224 that is extended upward from or connected to the second extension surface 223. The second extension surface 223 may be a flat surface, a tapered surface, a curved surface, or a combination thereof. The second assembling surface 224 may be a sloped surface.

The long hole 211 of the fixture 210 may include the bottom surface 212 and the first coupling surface 213, which is connected to the top of the bottom surface 212 and having rotation-assembled thereto an assembling element 230a or 230b. For example, the assembling element 230a or 230b may be a screw, and a screw thread may be formed on the first coupling surface 213.

The first stepped surface 214 may be connected to the top of the first coupling surface 213 and is extended horizontally outward. The first stepped surface 214 may absorb and disperse vertical stress from the abutment 220. Furthermore, the first stepped surface 214 may secure a space for coupling the abutment 220 to the long hole 211 of the fixture 210.

The first extension surface 215 may be extended from the top of the first stepped surface 214. The first extension surface 215 is merely an example and may be a flat surface, a tapered surface, a curved surface, or a combination thereof. A groove 216 for inserting and fixing the bump 222 of the abutment 220 thereto may be formed on the first extension surface 215.

The first extension surface 215 may include a first lower extension surface 215a, the groove 216, and a first upper extension surface 215b in a vertical direction upward, abutment 220 may include the second extension surface 223 connected to the top of the bump 222, and the first upper extension surface 215b and the second extension surface 223 may closely contact each other. However, it is merely an example. According to another embodiment, a gap that allows slight movements may be formed between the first upper extension surface 215b and the second extension surface 223.

The first assembling surface 217 may be connected to the top of the first extension surface 215, and the abutment 220 may include the second assembling surface 224 connected to the top of the second extension surface 223. According to some embodiments, the first assembling surface 217 and the second assembling surface 224 may closely contact each other.

As the bump 222 of the abutment 220 is inserted to the groove 216 of the fixture 210, the fixture 210 and the abutment 220 may be assembled to each other. According to another embodiment, a bump may be formed at the fixture 210 instead of a groove, a groove may be formed at the abutment 220 instead of a bump, and thus the fixture 210 and the abutment 220 may be coupled to each other via the bump and the groove.

Since the fixture 210 and the abutment 220 are not firmly assembled to each other, various irregular stresses occurring in a mouth of a user, such as mastication of the food and teeth grinding, may be dispersed. Furthermore, when the bump and the groove of the abutment 220 and the fixture 210 are assembled to each other, the 3-dimensional shape of the bump disperses weights applied in vertical directions in lateral directions, thereby reducing vertical stress. Similarly, various irregular stresses may be dispersed as vertical stresses are transformed to horizontal stresses by the sloped surfaces of the second assembling surface 224 and the first assembling surface 217.

There are cases where it is preferable to firmly assemble the fixture 210 and the abutment 220 to each other based on symptoms and prognosis of a patient, and thus it is necessary to control degree of the firm assembly. To this end, the abutment 220 and the fixture 210 may be coupled to each other via the separate assembling element 230a or 230b. According to an embodiment, a second coupling surface 225 to be coupled to the assembling element 230a or 230b is formed inside the abutment 220, where the assembling element 230a or 230b may be inserted to the second coupling surface 225 and rotation-assembled to the abutment 220. For example, the assembling element 230a or 230b may be a screw, and a screw thread may be formed on the second coupling surface 225.

The assembling element 230a or 230b assembles and fixes the abutment 220 to the fixture 210, where the assembling element 230a or 230b may be the shortened assembling element 230a with a relatively small length or the elongated assembling element 230b with a relatively large length.

As shown in FIG. 8B, the shortened assembling element 230a may be rotation-assembled to the second coupling surface 225 formed inside the abutment 220 and assembles and fixes the fixture 210 to the abutment 220. For example, the shortened assembling element 230a may be a screw, and a screw thread may be formed on the second coupling surface 225. Therefore, the shortened assembling element 230a may be coupled to the second coupling surface 225.

If the alveolar bone of a patient is relatively weak, the shortened assembling element 230a enables a weak coupling between the abutment 220 and the fixture 210, thereby allowing a movement of the implant unit 200B within a certain range. As a result, an implant unit and the alveolar bone may be protected from a normal mastication or abnormal stress, e.g., stress from teeth grinding. Furthermore, since assembly between the fixture 210 and the implant unit is weak immediately after the implant unit is implanted to the alveolar bone, stress applied to the implant unit may be dispersed or transmission of the stress may be partially blocked by a weak coupling based on the shortened assembling element 230a. As a result, the implant unit may function normally immediately after being implanted.

Furthermore, as shown in FIG. 8C, the elongated assembling element 230b may be rotation-assembled to the first coupling surface 213 formed inside the fixture 210 and the second coupling surface 225 formed inside the abutment 220 and assembles and fixes the fixture 210 and the abutment 220 to each other. In case of using the elongated assembling element 230b, it may be advantageous for firmly assembling the fixture 210 and the abutment 220 to each other as compared to a case of using the shortened assembling element 230a. Furthermore, since the groove 216 of the fixture 210 is coupled to the bump 222 of the abutment 220, the fixture 210 and the abutment 220 may be more firmly assembled to each other, where detachment and fracture of the elongated assembling element 230b may be prevented.

Furthermore, each of the first extension surface 215 and the second extension surface 223 of the abutment 220 may have a polygonal cross-section, such as a triangular cross-section, a rectangular cross-section, a pentagonal cross-section, or a hexagonal cross-section, and prevents rotation of the abutment 220. However, the above-stated polygonal shapes are merely examples, and it would have been obvious to one of ordinary skill in the art that an arbitrary polygonal shape for preventing rotation of the abutment 220 may be applied.

Furthermore, each of the first assembling surface 217 and the second assembling surface 224 may have a polygonal cross-section, such as a triangular cross-section, a rectangular cross-section, a pentagonal cross-section, or a hexagonal cross-section, and prevents rotation of the abutment 220. However, the above-stated polygonal shapes are merely examples, and it would have been obvious to one of ordinary skill in the art that an arbitrary polygonal shape for preventing rotation of the abutment 220 may be applied.

As shown in FIG. 8D, the lower portion of the abutment 220 may include a split rivet structure 226 including a plurality of pieces that are a certain distance apart from one another. The split rivet structure 226 includes the second coupling surface 225 therein to be coupled to the assembling element 230a or 230b for firm assembly between the fixture 210 and the abutment 220. The split rivet structure 226 includes a plurality of pieces 226P that are a certain distance apart from one another. The plurality of pieces 226P may have arc-like shapes corresponding to two, three, four, five, or more equally divided portions of a circle. According to another embodiment, the plurality of pieces 226P may have a shape corresponding to two, three, or more equally divided portions of a polygon, such as a rectangle, a pentagon, a hexagon, or a polygon with more vertices.

According to an embodiment, if the lower portion of the abutment 220 includes the split rivet structure 226, while the abutment 220 is being guided toward the bottom of the fixture 210 to be assembled to the fixture 210, the abutment 220 may be slightly further moved in a vertical direction as the plurality of pieces 226P of the split rivet structure 226 are closed toward the center axis CL, and thus stress may be reduced via absorption and dispersion.

If necessary, if the assembling element 230a or 230b is a screw and the lower portion of the screw moves to the lower portion of the abutment 220 and fills the internal space of the abutment 220, the plurality of pieces 226P are limited from being closed or the diameter of the lower portion of the abutment 220 is increased, and thus a firm assembly may be provided between the abutment 220 and the abutment 230. On the contrary, if the lower portion of the screw does not extend to the split rivet structure 226 of the abutment 220, the plurality of pieces 226P of the split rivet structure 226 may be elastically deformed, and thus a vertical stress applied from the abutment 230 may be absorbed and/or reduced as the plurality of pieces 226P are elastically deformed.

Figure 9:
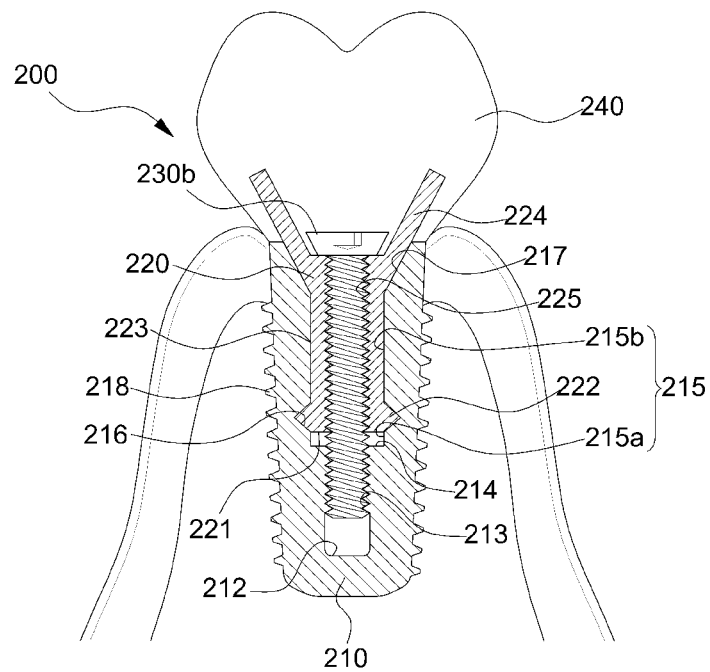
FIG. 9 is a sectional view of an implant unit in which a crown is coupled with an abutment.

The abutment 220 is rotation-assembled to the fixture 210 and functions as a supporter for mounting an artificial tooth or the crown 240. The abutment 220 may be formed of any one selected from among titanium (Ti), a surgical stainless steel, gold (Au), a white ceramic zirconium (Zr), and equivalents thereof. However, materials constituting the abutment 220 are not limited thereto. FIG. 9 is a sectional view of the implant unit 200 in which the crown 240 is coupled with the abutment 220. As shown in FIG. 9, an artificial tooth or the crown 240 may be assembled to the abutment 220. Meanwhile, the abutment 220 may be assembled to the fixture 210, where a gap G may be formed between the bottom surface 221 of the abutment 220 and the bottom surface 212 of the long hole 211 of the implant unit 200 and reduce stress applied to the abutment 220.

In the implant unit 200 according to an embodiment, a degree of assembly between the fixture 210 and the abutment 220 may be adjusted based on the condition of an alveolar bone of a patient. Furthermore, the gap G formed between the fixture 210 and the abutment 220 may protect an implant unit and an alveolar bone from harmful shocks from mastication of the food, teeth clenching, and teeth grinding.

Figure 10A:
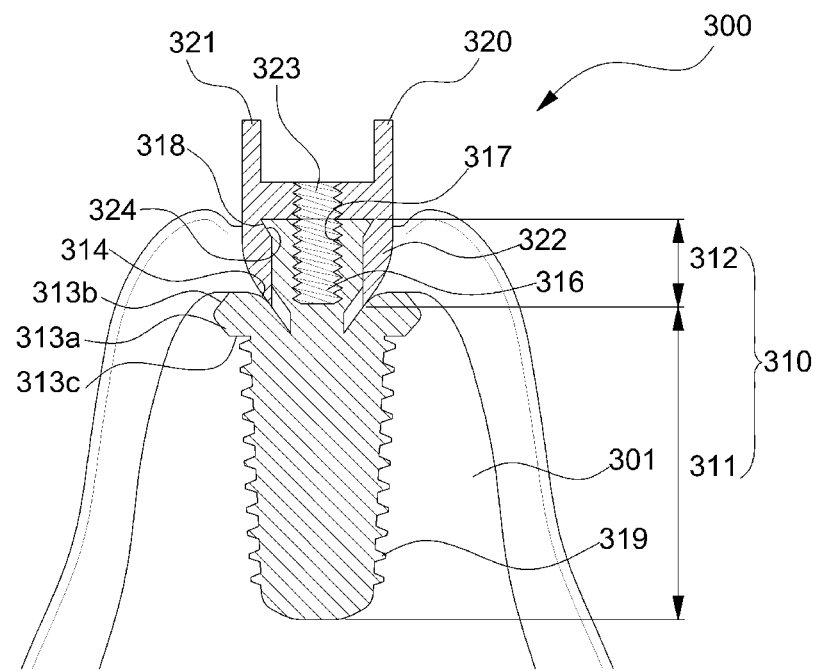
FIG. 10A is a sectional view of an implant unit according to another embodiment.
Figure 10B:
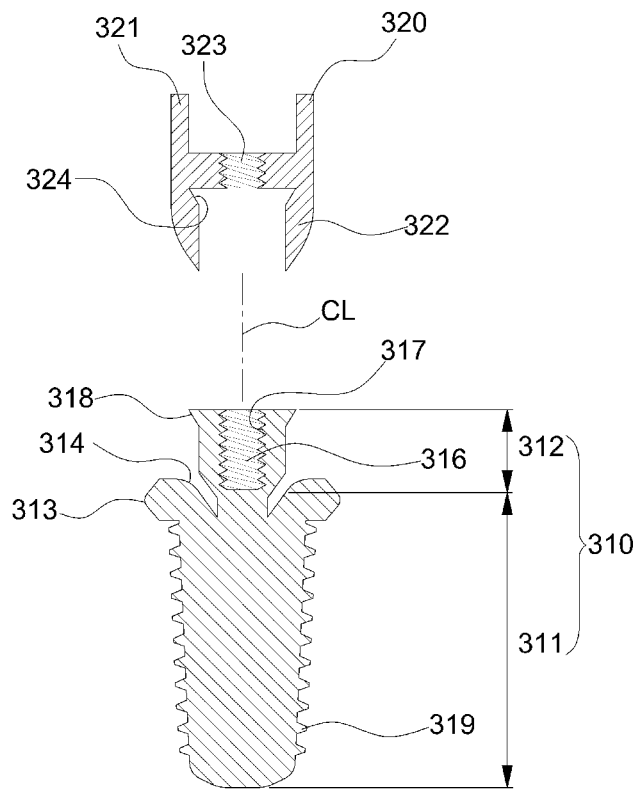
FIG. 10B is an exploded perspective view of the implant unit of FIG. 10A.
Figure 10C:
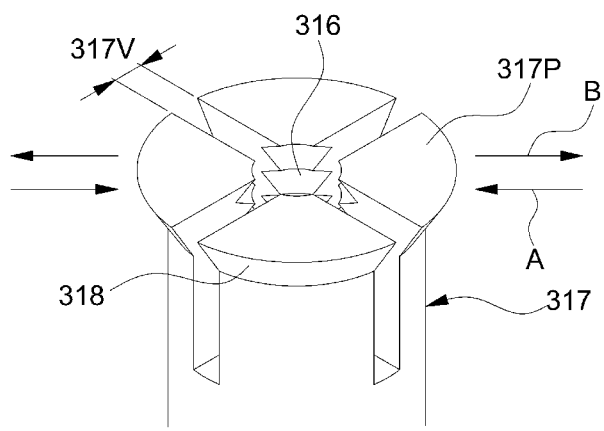
FIG. 10C is a perspective view of a settling portion of a fixture.
Figure 10D:
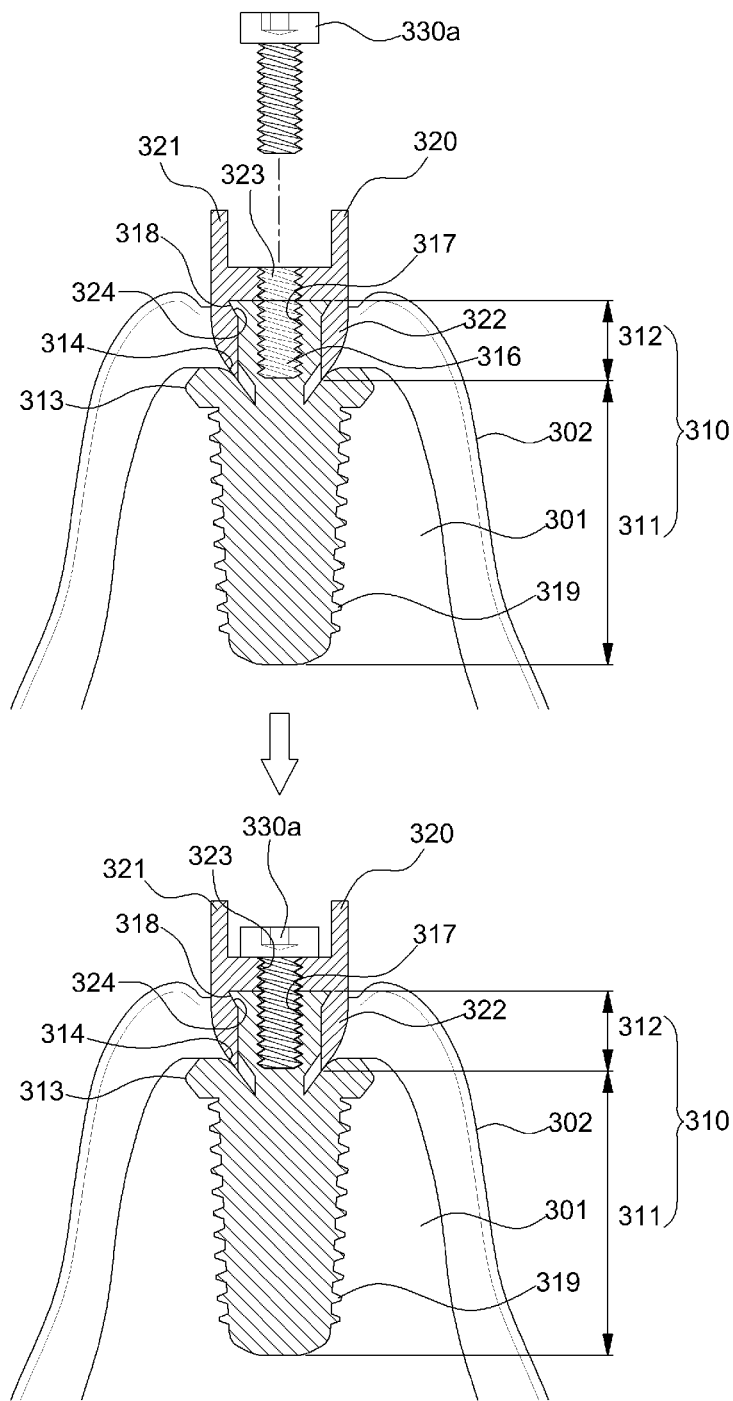
FIGS. 10D and 10E are sectional views of the implant unit assembled thereto an assembling element.
Figure 10E:
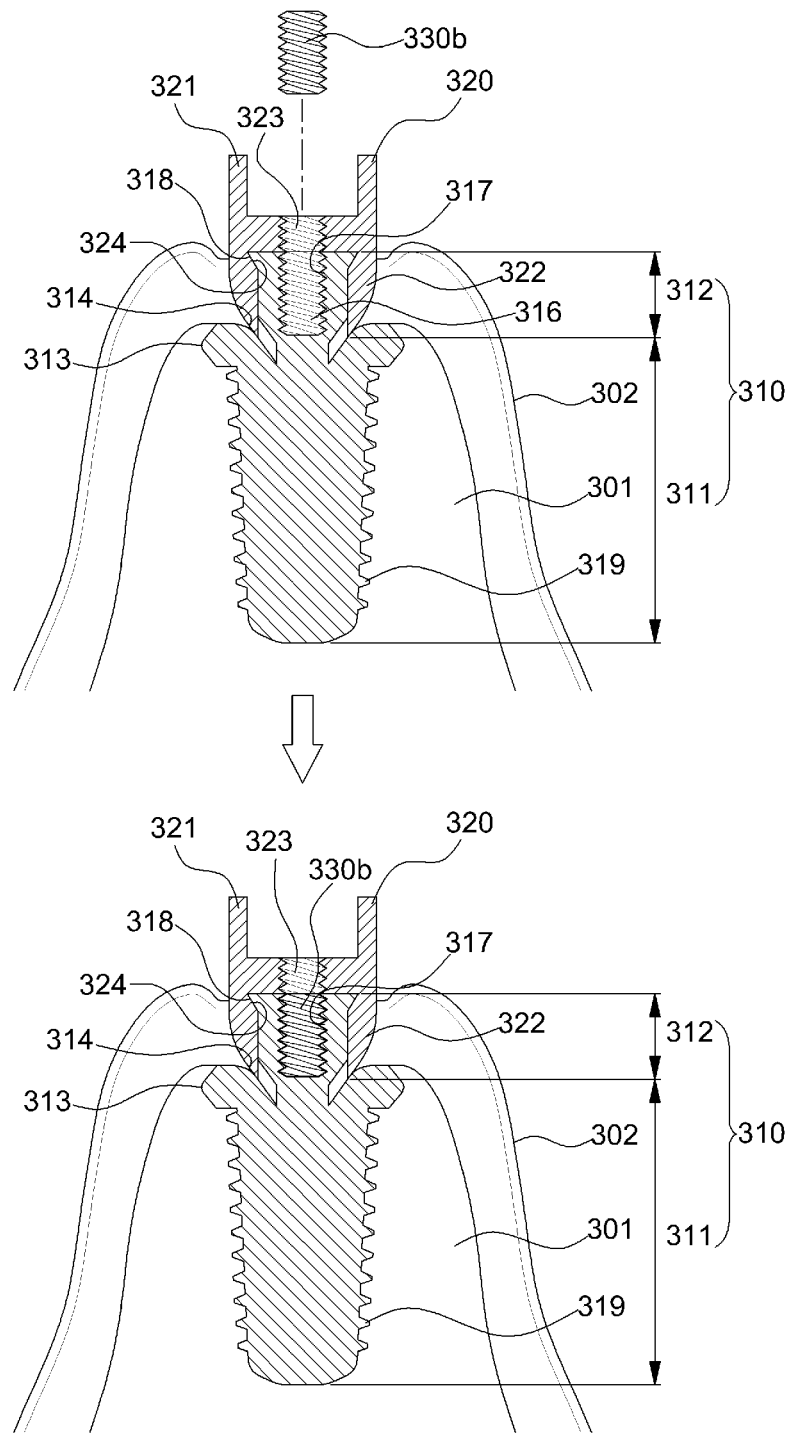
Figure 11:
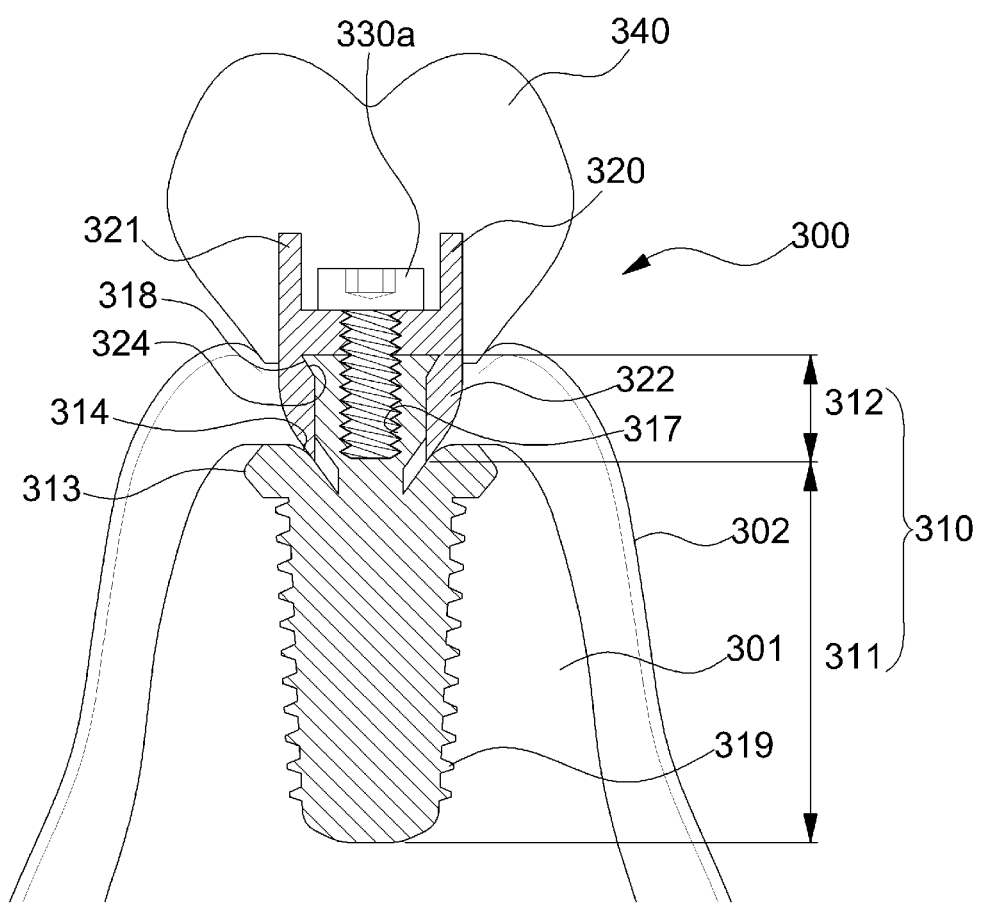
FIG. 11 is a sectional view of an implant unit in which a crown is assembled to an abutment.

FIG. 10A is a sectional view of an implant unit 300 according to another embodiment, FIG. 10B is an exploded perspective view of the implant unit 300 of FIG. 10A, FIG. 10C is a perspective view of a settling portion 312 of a fixture 310, FIGS. 10D and 10E are sectional views of the implant unit 300 having assembled thereto an assembling element 330a or 330b, and FIG. 11 is a sectional view of the implant unit 300 in which a crown 340 is assembled to an abutment 320.

Referring to FIG. 10A, the implant unit 300 according to an embodiment includes a fixture 310 implanted to an alveolar bone 301 and an abutment 320 assembled to the fixture 310. The fixture 310 is directly implanted to the alveolar bone 301 covered by a gum 302 and functions as a pillar. Around the alveolar bone 301, the fixture 310 includes a body 311 implanted to the body 311 and a settling portion 312 that protrudes out of the alveolar bone 301 and is assembled to the abutment 320.

The fixture 310 may contain titanium (Ti), tungsten (W), aluminium (Al), hafnium (Hf), niobium (Nb), tantalum (Ta), zirconium (Zr), platinum (Pt), or an alloy of any one of the metals. However, the above-stated metals are merely examples, and the present disclosure is not limited thereto. Any of other non-corrosive metals with suitable strength and biocompatibility, ceramic artificial bone materials, or composite combinations thereof may be applied to the fixture 310.

The fixture 310 may include a calcium phosphate-based ceramic coating layer, such as apatite hydroxide ($Ca_{10}(PO_4)_6(OH)_2$, HA), having excellent bioactivity on the surface of the fixture 310 to improve adhesion by promoting reactivity against the alveolar bone 101. According to another embodiment, a metal ceramic, such as $TiO_2$, $Ta_2O_5$, $Nb_2O_5$, $ZrO_2$, $SiO_2$, $RuO_2$, $MoO_2$, $MoO_3$, VO, $VO_2$, $V_2O_3$, $V_2O_5$, $CrO_2$, or $CrO_3$, may be coated on the fixture 310. The above-stated metals are merely examples, and one of ordinary skill in the art will understand that an arbitrary material capable of promoting osseointegration may be used as the coating material.

According to an embodiment, as shown in FIG. 10B, the fixture 310 includes the outer circumferential surface and bump 313 formed along the outer circumferential surface of the fixture 310. According to an embodiment, the bump 313 may be formed around the upper portion of the body 311 of the fixture 310 along the outer circumferential surface. The bump 313 may have a 3-dimensional shape including at least one of an acute angle-inclined surface 313a, an obtuse angle-inclined surface 313b, and a vertical surface 313c with respect to the center axis CL. According to another embodiment, the bump 313 may have a 3-dimensional shape including curved surfaces replacing the inclined surfaces 313a and 313b or includes a complex surfaces formed as tilted surfaces and curved surfaces are connected to each other. The 3-dimensional bump 313 3-dimensionally is extended, such that the contact surface against the alveolar bone 301 have various inclined surfaces and curved surfaces, thereby dispersing irregular and continuous stresses transmitted to the fixture 310 via the crown 340 in various directions. As a result, stress concentration at a certain region may be prevented.

According to an embodiment, the bump 313 may be formed at the upper portion of the body 311, where the length of the upper portion of the body 311 is greater than ⅓ of the entire length of the body 311. Stresses transmitted via the crown 340 may be generally concentrated at the upper portion of the body 311, where the bump 313 according to an embodiment may effectively disperse and absorb such stresses and enables dispersion and absorption of stresses throughout the fixture 310 in the depth direction. A sectional shape of the inner surface of the bump 313 may be a tapered shape.

According to an embodiment, the fixture 310 may further include a stress-reducing groove 314 defined by a space formed between the bump 313 and the settling portion 312. The sectional shape of the stress-reducing groove 314 may be a shape with the width decreasing downward from the top of the body 311 of the fixture 310 or a constant width. The stress-reducing groove 314 shown in FIG. 10A exemplifies a shape with the width decreasing in the depth direction. However, the shapes of the stress-reducing groove 314 are merely examples. For example, the stress-reducing groove 314 may be an arbitrarily-shaped area that may be defined by the outer circumferential surface of the body 311 of the fixture 310 and the bump 313 formed to be a certain distance apart from the outer circumferential surface of the body 311 of the fixture 310.

The stress-reducing groove 314 may be empty, filled with naturally-growing living tissues of a patient, or a separate elastic biocompatible polymer. The elastic biocompatible polymer may be a synthetic polymer, such as polyvinylpyrrolidone (PVP), polyethylene glycol (PEG), or poly-caprolactone, or a natural polymer, such as gelatin, chitosan, hyaluronic acid, or alginic acid. However, the above-stated materials are merely examples, and the present disclosure is not limited thereto, where any one of the other biocompatible resins known in the art may be applied thereto. The stress-reducing groove 314 may disperse and/or absorb stress transmitted via the settling portion 312 by allowing horizontal elastic deformation of the settling portion 312 or displacement of the body 311 due to the stress in a direction perpendicular to the center axis CL According to an embodiment, a bump 318 is formed on top of the settling portion 312 of the fixture 310 as an assembling element for assembling the abutment 320 thereto. When the settling portion 312 of the fixture 310 is assembled to the abutment 320, assembly of the bump 318 formed on top of the settling portion 312 to the groove 324 formed at the abutment 320 may prevent the abutment 320 from being rotated or slipped. However, an assembling element for assembling the settling portion 312 to the abutment 320 is not limited to the bump 318 and may be a ring or a friction clip. According to another embodiment, if the assembling element is a ring, the ring may be formed of a metal. For example, the ring may contain a shape memory alloy or a highly elastic metal. According to another embodiment, the assembling element may be a friction clip.

According to some embodiments, the settling portion 312 of the fixture 310 has a polygonal cross-section or an elliptical cross-section for preventing rotation or slip of the abutment 320. FIG. 10C exemplifies the settling portion 312 of the fixture 310 including the lower portion having a hexagonal cross-sectional shape. In the same regard, the lower portion of the abutment 320 may have a same cross-sectional shape to be assembled to the lower portion of the settling portion 312. When the abutment 320 is accommodated on the settling portion 312 having a hexagonal cross-sectional shape, the corresponding structures of the abutment 320 and the settling portion 312 limit the abutment 320 and the settling portion 312 from being relatively rotated and slipped.

According to another embodiment, the upper portion of the settling portion 312 may include a split rivet structure 317 including a plurality of pieces apart from one another. The split rivet structure 317 includes an assembling groove 316 therein for application of an assembling element 330a or 330b for firm assembly between the fixture 310 and the abutment 320. The split rivet structure 317 includes a plurality of pieces 317P that are a certain distance 317V apart from one another. The plurality of pieces 317P may have arc-like shapes corresponding to two, three, four, five, or more equally divided portions of a circle, as shown in FIG. 10C. According to another embodiment, the plurality of pieces 317P may have a shape corresponding to two, three, or more equally divided portions of a polygon, such as a rectangle, a pentagon, a hexagon, or a polygon with more vertices. If an upper portion of the settling portion 312 includes the split rivet structure 317, while the abutment 320 is being inserted and fixed to the settling portion 312, the split rivet structure 317 is allowed to be elastically closed in the directions indicated by the arrow A for easy insertion of the abutment 320. When the abutment 320 is completely inserted to the settling portion 312, the split rivet structure 317 is elastically recovered and opened in the directions indicated by the arrow B, and thus the settling portion 312 may be assembled to the abutment 320.

According to an embodiment, a first coupling structure 318 is formed around the upper portion of the settling portion 312 and, to be assembled to the settling portion 312 by covering the settling portion 312, a second coupling structure 324, which may be assembled to the first coupling structure 318 of the settling portion 312, may be provided at the lower portion of the abutment 320. The first coupling structure 318 and the second coupling structure 324 may be a bump and a groove for accommodating the same, as shown in FIG. 10C. As described above with reference to FIG. 10C, when the abutment 320 is completely inserted to the settling portion 312, the split rivet structure 317 is elastically recovered and opened as indicated by the arrow B, and thus the first coupling structure 318 of the settling portion 312 and the second coupling structure 324 of the abutment 320 are coupled to each other. As a result, the settling portion 312 and the abutment 320 may be assembled to each other. Based on strength of the settling portion 312, the assembly may be a firm assembly or an elastic assembly that allows the settling portion 312 and the abutment 320 to slightly move in relation to each other.

As described below with reference to FIG. 10D, an assembling element 330a or 330b that passes through the groove 323 of the abutment 320 and the assembling groove 316 of the settling portion 312, and assembles the abutment 320 and the settling portion 312 to each other may be further provided. In this case, based on the length and the shape of the assembling element 330a or 330b, the split rivet structure 317 of the settling portion 312 may no longer be elastically closed or opened, and thus the settling portion 312 and the abutment 320 may be firmly assembled to each other.

Bump patterns 321 and 322 may be provided at the upper portion and/or the lower portion of the abutment 320. The bump pattern 321 at the upper portion may improve assembly of an artificial tooth or the crown 340 assembled thereto. The bump pattern 322 at the lower portion may prevent relative rotation of the abutment 320 when the bump pattern 322 at the lower portion is assembled to the settling portion 312 of the fixture 310, thereby embodying stable assembly.

According to an embodiment, the fixture 310 may include the assembling groove 316 formed therein in the depth direction. The assembling element 330a or 330b may be coupled to the interior of the assembling groove 316, thereby firmly assembling the fixture 310 and the abutment 320 to each other. As shown in FIG. 10C, the depth of the assembling groove 316 may be identical to the height of the split rivet structure 317 of the settling portion 312. However, in consideration of a degree of assembly between the fixture 310 and the abutment 320 and the shape of the assembling element 330a or 330b, the assembling groove 316 may extend to the body 311 of the fixture 310.

According to another embodiment, the assembling element 330a or 330b is assembled to the interior of the assembling groove 316 and firmly assembles the fixture 310 and the abutment 320 to each other. A screw thread 315 may be formed inside the assembling groove 316, and thus the assembling element 330a or 330b may be rotation-assembled to the assembling groove 316. Based on shapes and purposes, the assembling element 330a or 330b may be a head-type screw 330a or a bar-type screw 330b without a head.

The body 311 of the fixture 310 may be implanted to the alveolar bone 301 and integrated with the alveolar bone 301. According to some embodiments, a thread having a bump pattern, such as a screw thread 319, may be formed on the surface of the body 311. In this case, the fixture 310 may be screw-fixed to the alveolar bone 301.

Referring to FIG. 10D, since the head-type screw 330a is rotation-assembled to the assembling groove 316 formed at the settling portion 312 of the fixture 310 and the groove 323 formed at the abutment 320 simultaneously and is firmly fixed by the head, movement of the abutment 320 may be minimized. When the head-type screw 330a is rotation-assembled to the assembling grooves 316 and 324 formed at the fixture 310 and the abutment 320. The fixture 310 is assembled to the alveolar bone 301 more firmly. Furthermore, the abutment 320 may be assembled to the fixture 310 more firmly via the head-type screw 330a.

Referring to FIG. 10E, the bar-type screw 330b passes through the groove 323 formed at the abutment 320 and is rotation-assembled and fixed to the assembling groove 316 formed at the settling portion 312 of the fixture 310 only, the bar-type screw 330b may allow some movement of the abutment 320. Although the bar-type screw 330b may be rotation-assembled to the assembling groove 316 formed at the abutment 320 and firmly assembles the fixture 310 to the fixture 310, the bar-type screw 330b is not directly assembled to the abutment 320, and thus some movement of the abutment 320 may be allowed.

The abutment 320 may be assembled to the settling portion 312 of the fixture 310. As shown in FIG. 11, the abutment 320 assembled to the settling portion 312 functions as a supporter for mounting an artificial tooth or the crown 340.

The abutment 320 may be formed of any one selected from among titanium (Ti), a surgical stainless steel, gold (Au), a white ceramic zirconium (Zr), and equivalents thereof. However, materials constituting the abutment 320 are not limited thereto. For example, the abutment 320 may be fully or partially formed of a shape-memory alloy.

Bump patterns 321 and 322 may be provided at the upper portion and/or the lower portion of the abutment 320. The bump pattern 321 at the upper portion may improve assembly of an artificial tooth or the crown 340 assembled thereto. The bump pattern 322 at the lower portion may prevent relative rotation of the abutment 320 when the bump pattern 322 the lower portion is assembled to the settling portion 312 of the fixture 310, thereby embodying stable assembly.

According to an embodiment, the groove 324 for accommodating the first coupling structure 318 formed at the settling portion 312 of the fixture 310 as described above is provided on the inner surface of the bump pattern 322 at the lower portion of the abutment 320. Furthermore, the inner surface of the bump pattern 322 at the lower portion of the abutment 320 may have a same cross-sectional shape, such that the inner surface of the bump pattern 322 at the lower portion of the abutment 320 may be assembled to the lower portion of the fixture 310 having a polygonal cross-sectional shape or an elliptical cross-sectional shape as described above. The groove 324 provided on the inner surface of the bump pattern 322 at the lower portion of the abutment 320 and the polygonal cross-sectional shape or the elliptical cross-sectional shape may prevent the abutment 320 from being relatively rotated and slipped, and thus a stable assembly may be embodied.

According to an embodiment of the present disclosure, by arranging a space that is defined by a groove-like structure formed in the depth direction from the lower portion of a fixture facing an alveolar bone, if the fixture is implanted to the alveolar bone, additional nutrition may be smoothly supplied from a gum to the alveolar bone, thereby stabilizing the alveolar bone. Therefore, the alveolar bone may be prevented from being absorbed. Furthermore, according to an embodiment, if the fixture includes the space, a space may be provided for bone cells to directly come out in case where bone transplant is necessary due to insufficient thickness of the alveolar bone, and thus success rate of the bone transplant may be increased. Furthermore, if the alveolar bone is dissolved and a periodontal pocket is formed while an implant unit is being used, the space may prevent the periodontal pocket from being formed deep into the gum. Furthermore, according to an embodiment, an implant unit may be stably implanted without a limit of thickness of the alveolar bone. Furthermore, an assembly structure capable of dispersing stress between a fixture and an abutment may increase lifespan of an implant unit.

Furthermore, according to another embodiment of the present disclosure, degree of assembly between a fixture and an abutment may be adjusted based on the form of an assembling element for assembling the fixture and the abutment to each other. Furthermore, a gap formed between the fixture and the abutment may disperse and/or absorb stress transmitted from the abutment to the fixture, thereby increasing lifespan of an implant unit. Furthermore, in case of a patient with a thin alveolar bone due to absorption of the alveolar bone or teeth with a relatively small distance therebetween, even if an implant unit having the minimum diameter is applied, stress may be efficiently absorbed and dispersed by a gap formed between a fixture and an abutment, and thus reliability equal to that of an implant unit having a relatively large size may be expected. Furthermore, an implant unit capable of increasing lifespan of the implant unit by preventing absorption of an alveolar bone by reducing stress at a tooth neck (where the implant unit meets the gum) via a gap formed between the fixture and the abutment may be provided. Furthermore, since an implant unit, which has a 2-stage structure including the fixture and the abutment and has a relatively small diameter, may be used. Therefore, an implant unit that may reduce additional surgeries, such as an additional bone grafting surgery, for reducing pain and recovery period after a surgery and surgery cost may be provided.

Furthermore, according to another embodiment of the present disclosure, as areas of bumps formed along the outer circumferential surface of a fixture 3-dimensionally expand a contact area between the bumps and an alveolar bone, stress transmitted to the settling portion of the fixture via a crown is dispersed and/or absorbed, and thus lifespan of an implant unit may be increased. Furthermore, in case of a patient with a thin alveolar bone due to absorption of the alveolar bone or teeth with a relatively small distance therebetween, even if an implant unit having the minimum diameter is applied, stress may be efficiently absorbed and dispersed by a gap formed between an fixture and an abutment, and thus reliability equal to that of an implant unit having a relatively large size may be expected. Furthermore, an implant unit capable of increasing lifespan of the implant unit by preventing absorption of an alveolar bone by reducing stress at a tooth neck (where the implant unit meets the gum) may be provided. Furthermore, since stress concentration may be resolved by forming the gap between the fixture and the intermediate structure, an implant unit having a relatively small diameter may be used. Therefore, an implant unit that may reduce additional surgeries, such as an additional bone grafting surgery, for reducing pain and recovery period after a surgery and surgery cost may be provided.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An implant unit comprising:
   a fixture that is capable of being assembled to an alveolar bone, wherein the fixture comprises:
      a body that is capable of being implanted and assembled to the alveolar bone and including a bump formed along outer circumferential surface of a top portion of the body;
      a settling portion that is capable of protruding out of an upper portion of the alveolar bone and extending from the body and including a first coupling structure; and
      a stress-reducing groove defined by a space formed in a depth direction of the body between the bump of the body and the settling portion, and the stress-reducing groove dispersing or absorbing a stress transmitted via the settling portion, by allowing a horizontal elastic deformation of the settling portion or a displacement of the fixture due to the stress in a direction vertical to a central axis of the fixture; and
   an abutment that comprises a first bump pattern being assembled to the settling portion of the fixture, a second bump pattern that is capable of being assembled to an artificial tooth or a crown and a second coupling structure being assembled to the first coupling structure of the settling portion,
   wherein, in a state where the settling portion and the abutment are assembled to each other, the stress-reducing groove is present between the bump and the settling portion,
   wherein the settling portion comprises a split rivet structure having a plurality of pieces apart from one another and extending from the body,
   wherein the plurality of pieces of the split rivet structure are elastically deformed while assembling the abutment to the fixture,
   wherein areas of the bump, which are capable of being implanted to the alveolar bone, are adapted to 3-dimensionally expand a contact area between the alveolar bone and the bump,
   wherein the bump has a diameter larger than a diameter of the abutment, and protrudes outward with respect to the abutment, and an upper surface of the bump has an exposed portion that is not covered by the abutment,
   wherein the settling portion further comprises an assembling groove formed in the split rivet structure, and a lower end of the stress-reducing groove is located at a position lower than a lower end of the assembling groove.

2. The implant unit of claim 1, wherein the stress-reducing groove are provided at the top portion of the body.

3. The implant unit of claim 2, wherein the settling portion of the fixture has at least one of a polygonal cross-sectional shape or an elliptical cross-sectional shape to prevent the abutment from being rotated and slipped.

4. The implant unit of claim 1, wherein an upper portion of the fixture comprises an assembly groove formed in depth direction, further comprising an assembling element inserted to the assembly groove.

5. The implant unit of claim 1, wherein the stress-reducing groove is filled with a polymer elastic material.

6. The implant unit of claim 1, wherein the lower end of the stress-reducing groove is located at a position lower than a lower end of the abutment, and the lower end of the stress-reducing groove is apart from the lower end of the abutment.

7. The implant unit of claim 1, wherein the stress-reducing groove has an inclined structure, the stress-reducing groove having an upper portion and a lower portion in a region of the inclined structure, the lower portion of the stress-reducing groove being closer to the central axis of the fixture than the upper portion of the stress-reducing groove.

* * * * *